United States Patent [19]

Abe et al.

[11] Patent Number: 5,694,244

[45] Date of Patent: Dec. 2, 1997

[54] REAL-IMAGE FINDER HAVING VARIABLE POWER

[75] Inventors: Tetsuya Abe, Hokkaido; Takayuki Ito, Tokyo; Sachio Hasushita, Tokyo; Moriyasu Kanai, Tokyo, all of Japan

[73] Assignee: Asahi Kogaku Kogyo Kabushiki Kaisha, Tokyo, Japan

[21] Appl. No.: 506,633

[22] Filed: Jul. 25, 1995

[30] Foreign Application Priority Data

Jul. 29, 1994 [JP] Japan .................... 6-178798

[51] Int. Cl.$^6$ .................... G02B 23/00; G02B 15/14
[52] U.S. Cl. .................... 359/432; 359/422; 359/431; 359/690
[58] Field of Search .................... 359/362, 421–422, 359/431–432, 676–677, 684, 685, 689–690, 708; 354/219–225; 396/373–386

[56] References Cited

U.S. PATENT DOCUMENTS

| 4,991,942 | 2/1991 | Fujibayashi et al. | 359/690 |
|---|---|---|---|
| 4,992,809 | 2/1991 | Nozaki et al. | 354/222 |
| 5,052,787 | 10/1991 | Sugawara | 359/683 |
| 5,191,477 | 3/1993 | Abe | 359/695 |
| 5,193,030 | 3/1993 | Nozaki et al. | 359/687 |
| 5,247,324 | 9/1993 | Estelle | 354/222 |
| 5,257,134 | 10/1993 | Sugawara | 359/690 |
| 5,260,834 | 11/1993 | Shibata et al. | 359/690 |
| 5,367,399 | 11/1994 | Yoneyama et al. | 359/690 |
| 5,410,430 | 4/1995 | Ito et al. | 359/422 |
| 5,543,969 | 8/1996 | Ito | 359/690 |

FOREIGN PATENT DOCUMENTS

| 89309 | 4/1991 | Japan | 359/690 |
|---|---|---|---|
| 2225444 | 5/1995 | United Kingdom . | |

*Primary Examiner*—Thong Nguyen
*Attorney, Agent, or Firm*—Greenblum & Bernstein P.L.C.

[57] ABSTRACT

A real-image finder having variable power includes an objective lens system of positive power, a condenser lens, and an ocular lens system. The objective lens system includes a first positive lens group, a second negative lens group, and a third positive lens group from an object side towards an image side. The second lens group is moved toward an image side and the third lens group is moved toward an object side, when the magnification changes from a wide angle side to a telephoto side. Thus, the distance between the first and second lens groups increases, the distance between the second and third lens groups decreases, and the distance between the third lens group and the condenser lens increases. The real-image finder meets the requirements defined by the relationships $0.5<|m_{2w}|<1.0$; $1.1<|m_{2T}|$; $0.5<|m_{3w}|1.0$; and, $1.1<|m_{3T}|$, where "$m_{2w}$" and "$m_{2T}$" designate the lateral magnification of the second lens group on the wide angle and telephoto sides, and "$m_{3w}$" and "$m_{3T}$" designate the lateral magnification of the third lens group on the wide angle and telephoto sides.

11 Claims, 16 Drawing Sheets

Spherical Aberration
Chromatic Aberration

Transverse Chromatic Aberration

Astigmatism

Distortion

Spherical Aberration
Chromatic Aberration

Transverse Chromatic Aberration

Astigmatism

Distortion

REAL-IMAGE FINDER HAVING VARIABLE POWER

BACKGROUND OF THE INVENTION

1. Field of the Invention

The present invention relates to a real-image finder having an increased zoom ratio, which can be used for a compact camera, etc.

2. Description of Related Art

The zoom ratios of almost all conventional variable power real-image finders for compact cameras are less than three times. An objective lens system is usually made up of a zoom lens system having two lens groups, a negative lens group and a positive lens group.

SUMMARY OF THE INVENTION

It is the aim of the present invention to provide a small real-image finder having a zoom ratio of more than three times, which is realized by an improved arrangement of the objective lens system and power distribution thereof.

To achieve the object mentioned above, according to the present invention, a real-image finder is provided having variable power comprising an objective lens system of positive power, a condenser lens, and an ocular lens system, in this order from the object side. The objective lens system comprises at least three lens groups including a first lens group of positive power, a second lens group of negative power, and a third lens group of positive power arranged in this order from the object side. The second and third lens group are moved toward an image side and an object side, respectively, when the magnification changes from wide angle to telephoto. The distance between the first lens group and the second lens group increases, the distance between the second lens group and the third lens group decreases, and the distance between the third lens group and the condenser lens increases. The real-image finder meets the requirements defined by the following relationships (1) through (4) below:

(1) $0.5 < |m_{2\ W}| < 1.0$
(2) $1.1 < |m_{2\ T}|$
(3) $0.5 < |m_{3\ W}| < 1.0$
(4) $1.1 < |m_{3\ T}|$ where $m_{2\ W}$ represents a lateral magnification of the second lens group at the wide angle end, $m_{2\ T}$ represents a lateral magnification of the second lens group at the telephoto end, $m_{3\ W}$ represents a lateral magnification of the third lens group at the wide angle end and $m_{3\ T}$ represents a lateral magnification of the third lens group at the telephoto end.

Preferably, the real-image finder further satisfies the following relationships;

(5) $1.1 < |m_{2\ T}| < 1.7$
(6) $1.1 < |m_{3\ T}| < 1.7$

In a preferred embodiment, upon varying the magnification, the second and third lens groups are moved without moving the first lens group. Namely, the first lens group does not move when the magnification is varied. This simplifies the mechanical structure of the lens barrel.

Preferably, the surfaces of the first lens group and the second lens group, that are opposed at a predetermined spatial distance defined by an image side surface of the first lens group and an object side surface of the second lens group, are aspherical surfaces. The aspherical surface of the first lens group can be made of a convex surface facing the image side, and having positive surface power which is decreased toward the peripheral edge thereof. The aspherical surface of the second lens group can be made of a concave surface facing the object side and having negative surface power which is decreased toward the peripheral edge thereof.

The second lens group can be made of a single concavo-concave, i.e. concavo-concave lens of negative power having aspherical surfaces on both sides. These aspherical surfaces belonging to the negative concavo-concave lens have negative surface power which decreases toward the peripheral edge thereof.

The first positive lens group, the second negative lens group, and the third positive lens group, of the objective lens system can each be made of a single lens.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
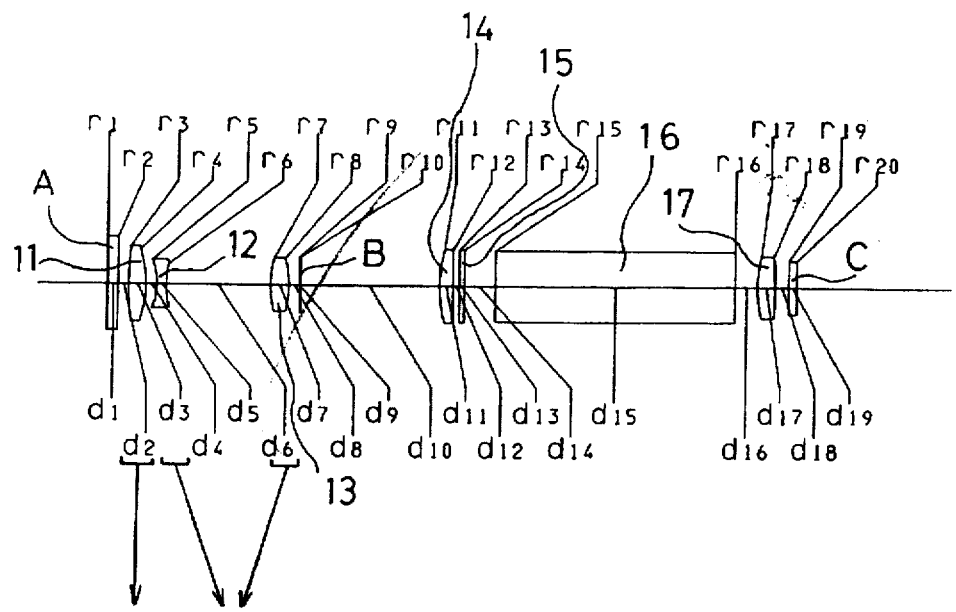
FIG. 1 is a schematic view showing a lens arrangement for a real-image finder of variable power at a wide angle extremity, according to the first embodiment of the present invention.

In a conventional real-image finder having variable power in which an objective lens system is comprised of two movable lens groups, i.e., a first negative lens group and a second positive lens group, it is necessary to move the second (positive) lens group by a large displacement in order to obtain a zoom ratio of more than three times. This is because only the second lens group has a magnification varying function. This makes it difficult to achieve a small real-image finder.

Contrary to a conventional real-image finder, and according to the essential features of the present invention, the objective lens system is comprised of at least three lens groups including a first positive lens group, a second negative lens group, and a third positive lens group, arranged in this order from the object side. The power distribution of the objective lens system is determined so as to meet the requirements defined by the formulae (1) through (4), so that both the second negative lens group and the third positive lens group have a power varying function.

In addition to this, both the second and third lens groups in the present invention, have approximately the same power ratio in a high magnification, including an actual size magnification, i.e., a magnification equal to "1". Consequently, not only can a high zoom ratio be obtained, but the finder can also be made small.

The formulae (1) and (2) specify the lateral magnification of the second lens group at the wide angle end and the telephoto end, respectively.

The formulae (3) and (4) specify the lateral magnification of the third lens group at the wide angle end and the telephoto end, respectively.

If the value in formula (1) is below the lower limit, the three-lens group system is substantially functionally identical to a conventional two-lens group zoom lens system and a large displacement of the third positive lens group, which corresponds to the second lens group of the two-lens group system is necessary, and hence it is difficult to make the finder small. Conversely, if the value in the formula (1) exceeds the upper limit, the fluctuation of the aberrations caused by the movement of the second lens group is too large to correct.

If the value in formula (2) is smaller than the lower limit, it is impossible to achieve the object to obtain a high zoom ratio.

If the value in formula (3) is smaller than the lower limit, the displacement of the second lens group is large, thus a small finder can not be realized. Conversely, if the value exceeds the upper limit in formula (3), the fluctuation of the aberrations caused by the movement of the third lens group is too large to correct.

If the value in formula (4) is smaller than the lower limit, it is impossible to achieve the object to obtain a high zoom ratio.

The formulae (5) and (6) specify the upper and lower limits of the lateral magnification of the second lens group and the third lens group. To increase the zoom ratio, it is necessary for the lateral magnification to be larger than the lower limits defined in formulae (2) and (4). For the purpose of making the finder small, if each lens group is made up of one or two lenses, it is preferable that the lateral magnification is smaller than the upper limits in the formulae (5) and (6) to correct the aberrations at the telephoto side.

Preferably, the first lens group does not move upon varying the magnification, so that the mechanism as a whole can be simple due to the fixed first lens group.

In the present invention, both the first positive and second negative lens groups, whose distance changes with respect to each other, are preferably provided with at least one aspheric surface so as to correct the aberration in the respective lens groups made up of one or two lenses. The aspheric surfaces are preferably provided on the surfaces of the first and second lens groups that are opposed at a predetermined spatial distance defined by an image side surface of said first lens group and an object side surface of said second lens group to effectively eliminate or correct the aberrations.

The power of the aspheric surface is preferably reduced from the center toward the peripheral edges of the lenses. Namely, if the aspheric lens surface is made of a convex surface of positive power that faces the image side, such as the last lens surface of the first lens group that is opposed to the second lens group, the positive surface power decreases toward the peripheral edge of the lens surface. On the other hand, if the aspheric lens surface is made of a concave surface of negative power that faces the object side, such as the first lens surface of the second lens group that is opposed to the first lens group, the negative surface power decreases toward the peripheral edge of the lens surface. The use of such aspheric lens surfaces makes it possible not only to effectively correct the aberrations within each lens group, but also to reduce the amount of aberration of each lens surface. Consequently, there is less adverse influence on the performance of the finder, due to, a manufacturing error in the shape of the aspheric lens surfaces or failure to axial alignment of the lenses, etc.

To provide a small finder, the second negative lens group is preferably made of a single lens. If the second lens group, which has the largest power, is made of a single lens, the second lens group is preferably a negative concavo-concave lens. Preferably, both the concave surfaces are aspheric surfaces. The aspheric surfaces are preferably such that the negative surface power thereof decreases toward the peripheral edges of the lenses. This is to enhance the aberration correcting capability within the second lens group. Furthermore, little or no deterioration in the optical efficiency of the finder due to a manufacturing error occurs.

Several numerical example embodiments of a real-image finder will be discussed below, according to the present invention.

Embodiment 1

FIGS. 1 through 4 show a first embodiment of the invention.

Figure 3:
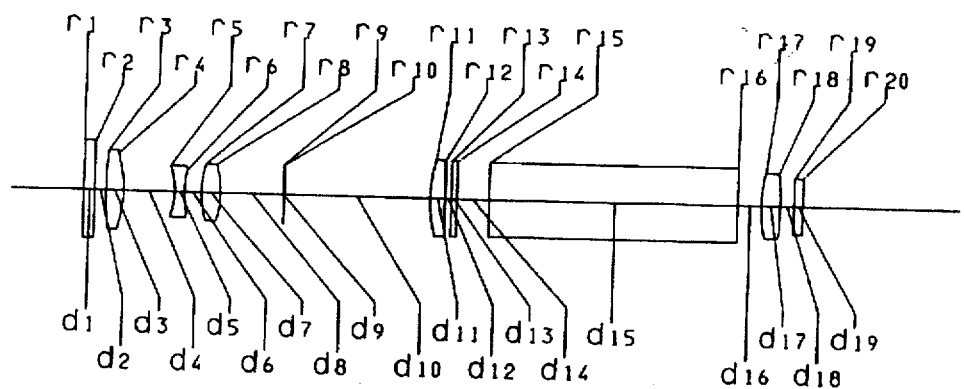
FIG. 3 is a schematic view showing a lens arrangement for a real-image finder of variable power at a telephoto extremity, according to the first embodiment of the present invention.

Numerical data for this lens system is shown in Table 1 below. The lens arrangements thereof at the wide angle extremity and the telephoto extremity are shown in FIGS. 1 and 3, respectively.

In the first embodiment, the lens system is comprised of a glass cover "A", a first lens group 11, a second lens group 12, a third lens group 13, a glass cover "B" (for a mirror), a condenser lens group 14, a filter (for indication within the finder) 15, a prism (image erecting optical system) 16, an ocular lens group 17, and a glass cover "C", in this order from the object side. The first, second and third lens groups 11, 12 and 13 constitute an objective lens system. In the illustrated embodiment, the first, second and third lens groups are each made of a single lens. However, the second lens group 12 is made of a single negative concavo-concave lens.

Figure 2:
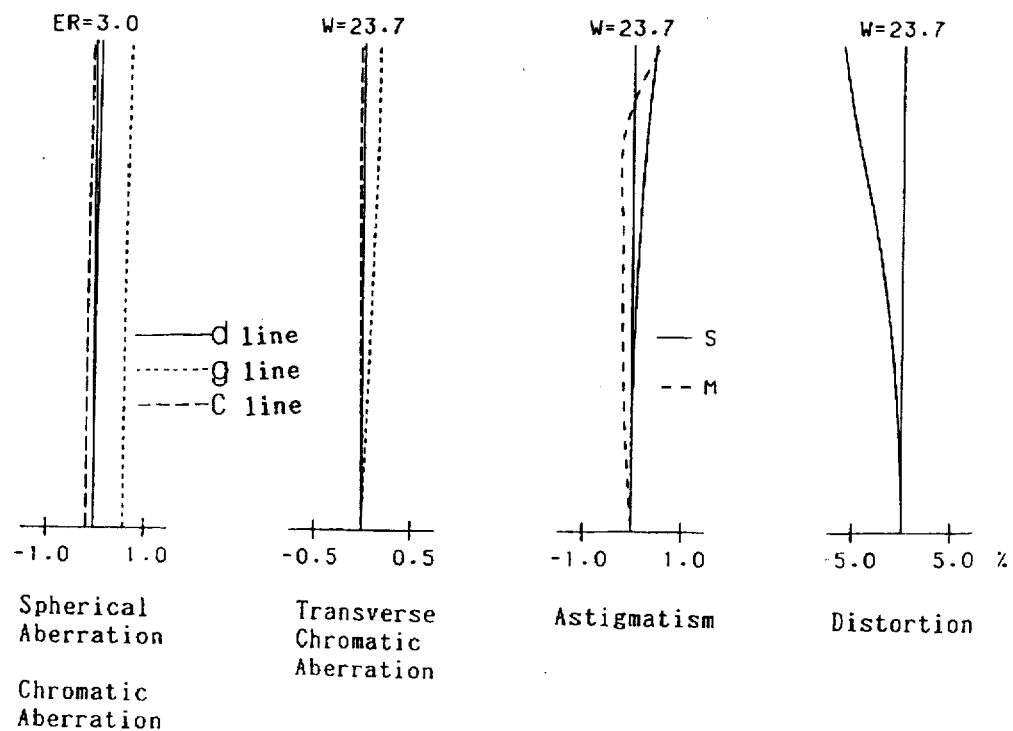
FIG. 2 shows diagrams of various aberrations of the real-image finder shown in FIG. 1.
Figure 4:
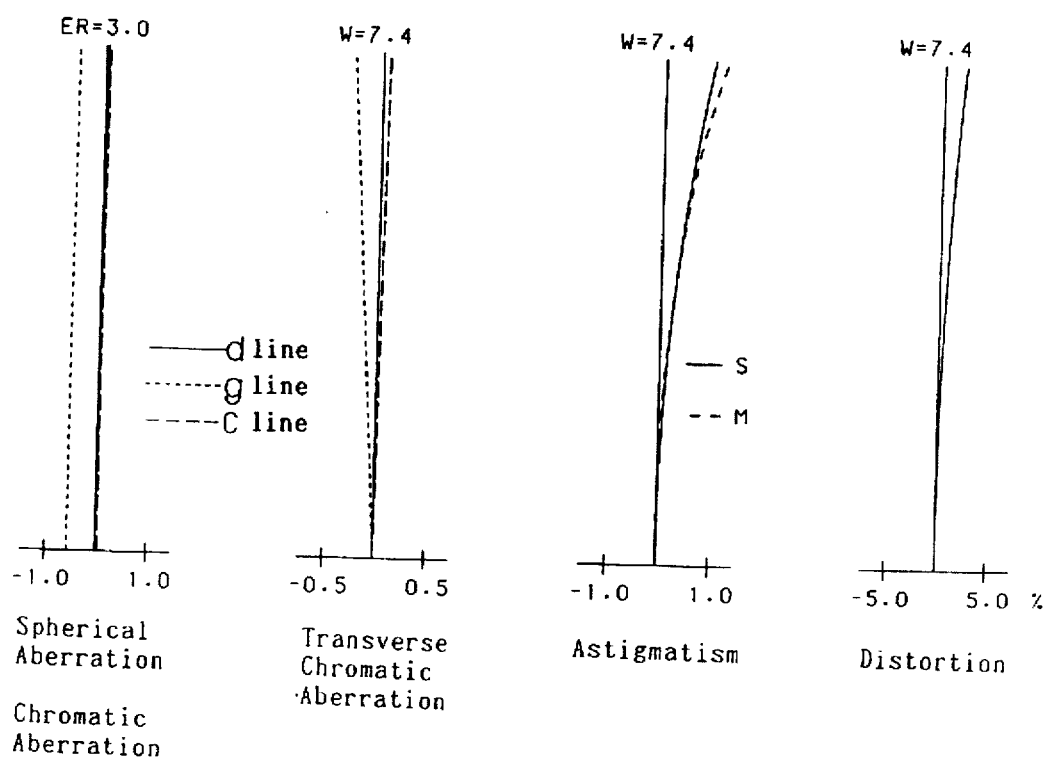
FIG. 4 shows diagrams of various aberrations of the real-image finder shown in FIG. 3.

FIGS. 2 and 4 show aberrations at the wide angle extremity and the telephoto extremity in the first embodiment, respectively. In the drawings and tables below, "SA" designates the spherical aberration; "SC" the sine condition; "d-line", "g-line" and "c-line" the chromatic aberrations represented by the spherical aberrations, and the lateral (transverse) chromatic aberrations, at the respective wavelengths; and "S" and "M" the sagittal ray and meridional ray, respectively. Furthermore, "ω" designates the half angle of view; "ER" the diameter of the eye ring; "$f_o$" the focal length of the objective lens group; "fe" the focal length of the ocular lens group; "R" the radius of curvature of each lens surface; "D" the distance between the lenses or lens thickness; "$N_d$" the refractive index of the d-line: and "νd" the Abbe number of the d-line, respectively.

TABLE 1

$\omega = 23.7°\sim7.4°$
ER: φ 3
eye relief; 12.0 (from the second surface of the glass cover C)
$f_o = 12.24\sim8.21$
$f_e = 27.95$
finder magnification; 0.44~1.37
diopter; −1.0—1.0 dptr (for an object located 3 m ahead)

| Surface No. | R | D | $N_d$ | $\nu_d$ | |
|---|---|---|---|---|---|
| 1 | ∞ | 1.55 | 1.49176 | 57.4 | (glass cover A) |
| 2 | ∞ | 1.49 | — | — | (glass cover A) |
| 3 | 43.300 | 2.50 | 1.49176 | 57.4 | |
| 4 * | −14.390 | 1.52–6.95 | — | | |
| 5 * | −8.500 | 1.40 | 1.58547 | 29.9 | |
| 6 * | 13.110 | 14.98–2.39 | — | — | |
| 7 | 13.900 | 2.70 | 1.49176 | 57.4 | |
| 8 * | −12.611 | 1.50–8.65 | — | — | |
| 9 | ∞ | 0.20 | 1.49176 | 57.4 | (glass cover B) |
| 10 | ∞ | 19.94 | — | — | (glass cover B) |
| 11 | 20.049 | 2.00 | 1.66680 | 33.0 | |
| 12 | −379.030 | 0.80 | — | — | |
| 13 | ∞ | 0.80 | 1.51633 | 64.1 | (filter) |
| 14 | ∞ | 4.40 | — | — | (filter) |
| 15 | ∞ | 34.14 | 1.80518 | 25.4 | (prism) |
| 16 | ∞ | 3.15 | — | — | (prism) |
| 17 * | 18.113 | 2.60 | 1.49176 | 57.4 | |
| 18 | −54.300 | 2.00 | — | — | |
| 19 | ∞ | 1.20 | 1.49176 | 57.4 | (glass cover C) |
| 20 | ∞ | — | — | — | (glass cover C) |

Aspherical data

NO. 4; $K = 0.0, A4 = 0.14830 \times 10^{-3}, A6 = -0.34900 \times 10^{-6},$
$A8 = 0.0, A10 = 0.0, A12 = 0.0$ NO. 5; $K = 0.0, A4 = 0.47700 \times 10^{-3}, A6 = 0.21400 \times 10^{-5},$
$A8 = 0.0, A10 = 0.0, A12 = 0.0$ NO. 6; $K = 0.0, A4 = -0.21670 \times 10^{-3}, A6 = 0.32000 \times 10^{-5},$
$A8 = 0.0, A10 = 0.0, A12 = 0.0$ NO. 8; $K = 0.0, A4 = 0.25250 \times 10^{-3}, A6 = 0.84200 \times 10^{-6},$
$A8 = 0.0, A10 = 0.0, A12 = 0.0$ NO. 17; $K = 0.0, A4 = -0.34600 \times 10^{-4}, A6 = -0.99800 \times 10^{-6},$
$A8 = 0.11070 \times 10^{-7}, A10 = 0.0, A12 = 0.0$

* marked surface is aspherical.

The shape of the aspheric surface can be generally expressed as follows:

$$X=CY^2/\{1+[1-(1+K)C^2Y^2]^{1/2}\}+A_4Y^4+A_6Y^6+A_8Y^8+A_{10}Y^{10}+\ldots$$

where

Y represents a height above the axis,

X represents a distance from a tangent plane of an aspherical vertex,

C represents a curvature of the aspherical vertex(1/r),

K represents a conic constant, $A_4$ represents a fourth-order aspherical factor, $A_6$ represents a sixth-order aspherical factor, $A_8$ represents a eighth-order aspherical factor, and $A_{10}$ represents a tenth-order aspherical factor.

Embodiment 2

Figure 5:
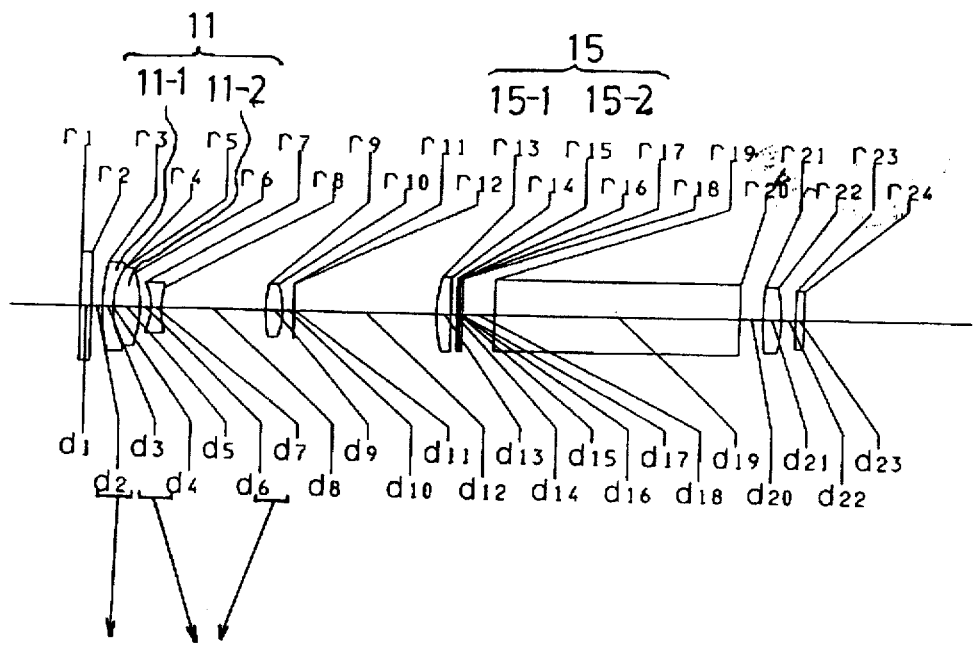
FIG. 5 is a schematic view showing a lens arrangement for a real-image finder of variable power at a wide angle extremity, according to the second embodiment of the present invention.
Figure 6:
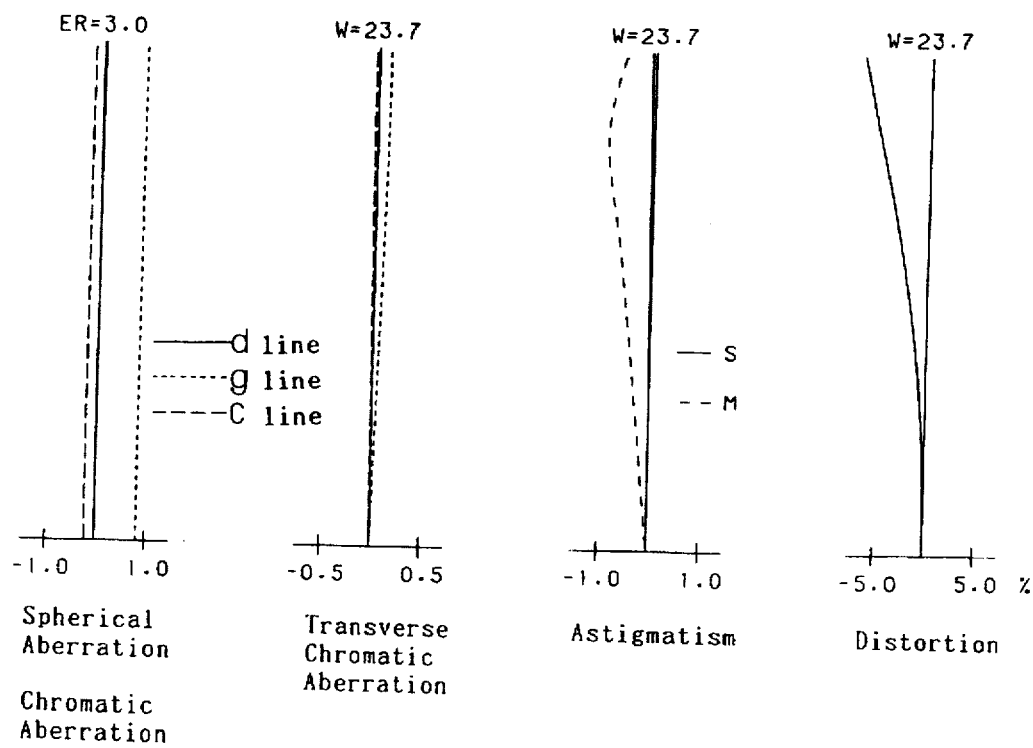
FIG. 6 shows diagrams of various aberrations of the real-image finder shown in FIG. 5.
Figure 7:
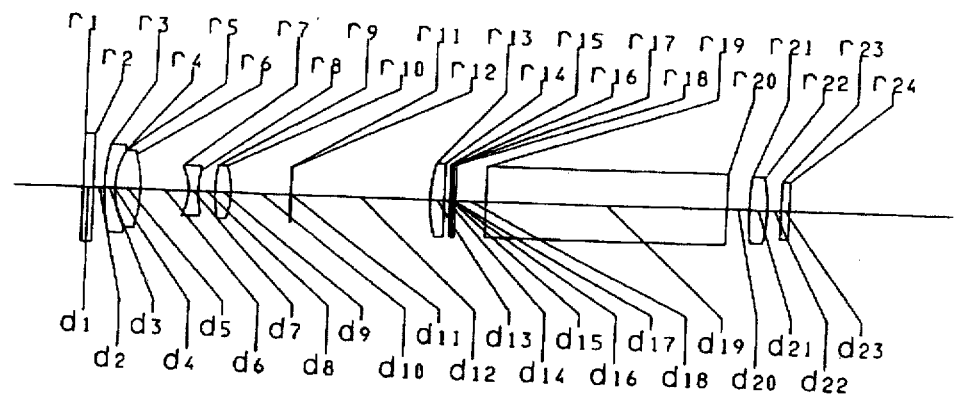
FIG. 7 is a schematic view showing a lens arrangement for a real-image finder of variable power at a telephoto extremity, according to the second embodiment of the present invention.

FIGS. 5 through 8 show a second embodiment of a variable power real-image finder, according to the present invention. FIGS. 5 and 7 show lens arrangements at the wide angle extremity and the telephoto extremity, respectively. In the second embodiment, the first lens group 11 is made of cemented first and second lens elements 11-1 and 11-2; and, the filter 15 is made of two cemented filter elements 15-1 and 15-2. The rest of the second embodiment structure is the same as that of the first embodiment.

Figure 8:
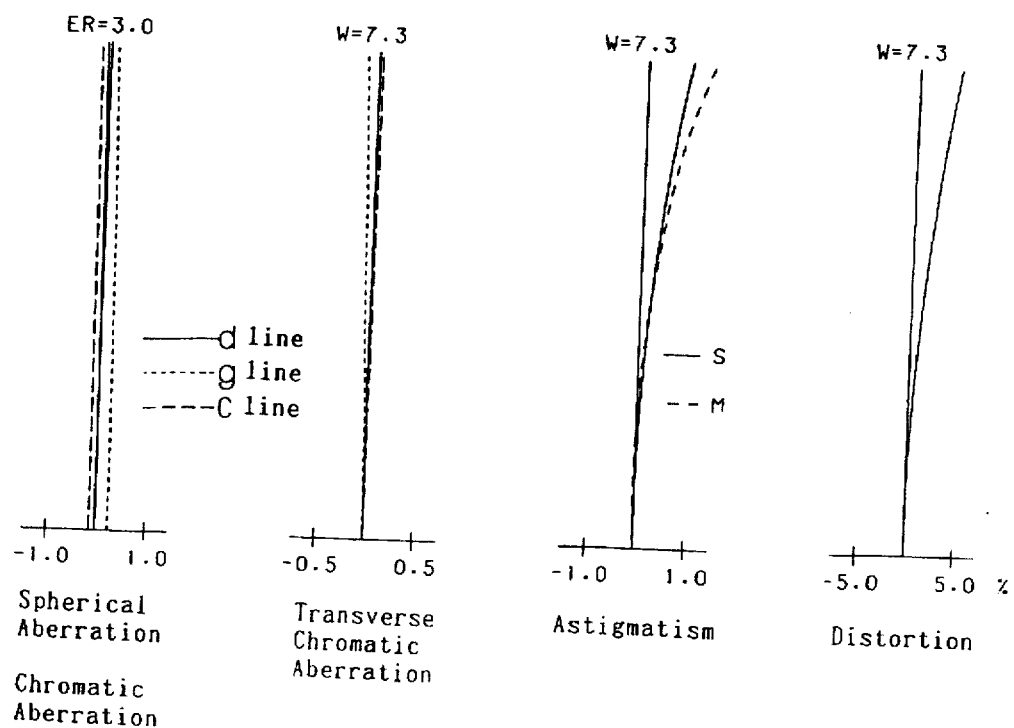
FIG. 8 shows diagrams of various aberrations of the real-image finder shown in FIG. 7.

Numerical data for this lens system is shown in Table 2 below. Aberrations at the wide angle extremity and the telephoto extremity are shown in FIGS. 6 and 8, respectively.

TABLE 2

$\omega = 23.7°\sim7.3°$
ER: $\phi$ 3
eye relief; 13.59 (from the second surface of the glass cover C)
$f_o = 12.33\sim38.17$
$f_e = 28.68$
finder magnification; 0.43~1.33
diopter; $-1.0\sim-1.0$ dptr (for an object located 3 m ahead)

| Surface No. | R | D | $N_d$ | $v_d$ | |
|---|---|---|---|---|---|
| 1 | ∞ | 1.55 | 1.49176 | 57.4 | (glass cover A) |
| 2 | ∞ | 1.49 | — | — | (glass cover A) |
| 3 | 27.000 | 1.50 | 1.58547 | 29.9 | |
| 4 | 10.500 | 0.00 | — | — | |
| 5 | 10.500 | 3.80 | 1.49176 | 57.4 | |
| 6 * | −14.770 | 1.50–6.78 | — | — | |
| 7 * | −6.608 | 1.40 | 1.49176 | 57.4 | |
| 8 * | 11.662 | 14.68–2.48 | — | — | |
| 9 | 18.454 | 2.38 | 1.49176 | 57.4 | |
| 10 * | −10.109 | 1.50–8.43 | — | — | |
| 11 | ∞ | 0.20 | 1.49176 | 57.4 | (glass cover B) |
| 12 | ∞ | 19.80 | — | — | (glass cover B) |
| 13 | 19.138 | 2.00 | 1.66680 | 33.0 | |
| 14 | ∞ | 0.80 | — | — | |
| 15 | ∞ | 0.40 | 1.51633 | 64.1 | (filter) |
| 16 | ∞ | 0.00 | — | — | (filter) |
| 17 | ∞ | 0.40 | 1.51633 | 64.1 | (filter) |
| 18 | ∞ | 4.40 | — | — | (filter) |
| 19 | ∞ | 34.14 | 1.80518 | 25.4 | (prism) |
| 20 | ∞ | 3.15 | — | — | (prism) |
| 21 * | 39.167 | 2.60 | 1.49176 | 57.4 | |
| 22 | −21.558 | 2.00 | — | — | |
| 23 | ∞ | 1.20 | 1.49176 | 57.4 | (glass cover C) |
| 24 | ∞ | — | — | — | (glass cover C) |

Aspherical data

NO. 6;  K = 0.0, A4 = 0.13660 × $10^{-3}$, A6 = −0.33100 × $10^{-6}$,
A8 = 0.0, A10 = 0.0, A12 = 0.0
NO. 7;  K = 0.0, A4 = 0.95500 × $10^{-3}$, A6 = 0.68300 × $10^{-5}$,
A8 = 0.0, A10 = 0.0, A12 = 0.0
NO. 8;  K = 0.0, A4 = −0.13500 × $10^{-3}$, A6 = 0.17000 × $10^{-5}$,
A8 = 0.0, A10 = 0.0, A12 = 0.0
NO. 10; K = 0.0, A4 = 0.24600 × $10^{-3}$, A6 = 0.72000 × $10^{-6}$,
A8 = 0.0, A10 = 0.0, A12 = 0.0
NO. 21; K = 0.0, A4 = −0.32200 × $10^{-4}$, A6 = −0.54600 × $10^{-6}$
A8 = 0.46500 × $10^{-8}$, A10 = 0.0, A12 = 0.0

* marked surface is aspherical.

Embodiment 3

Figure 9:
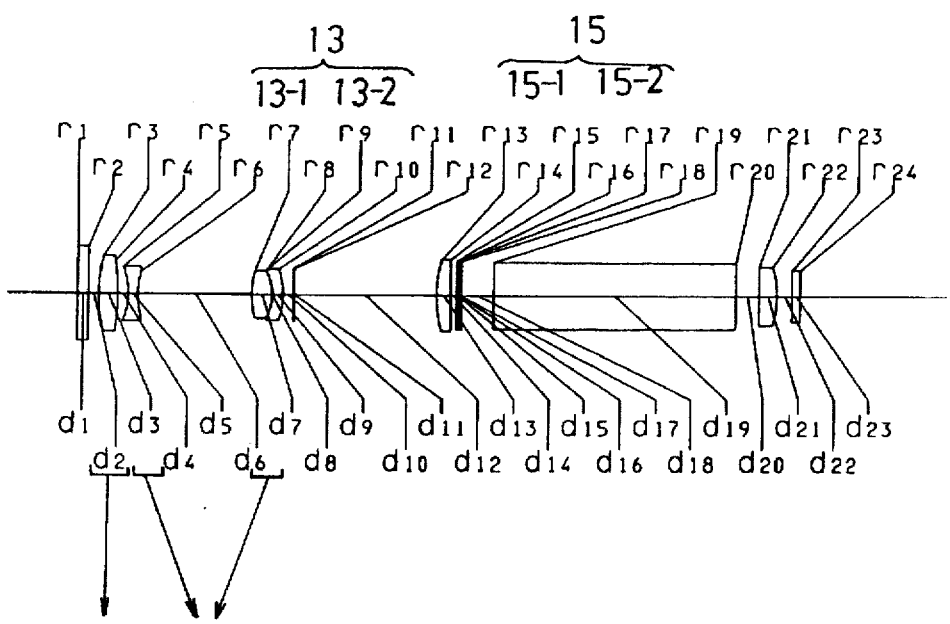
FIG. 9 is a schematic view showing a lens arrangement for a real-image finder of variable power at a wide angle extremity, according to the third embodiment of the present invention.
Figure 10:
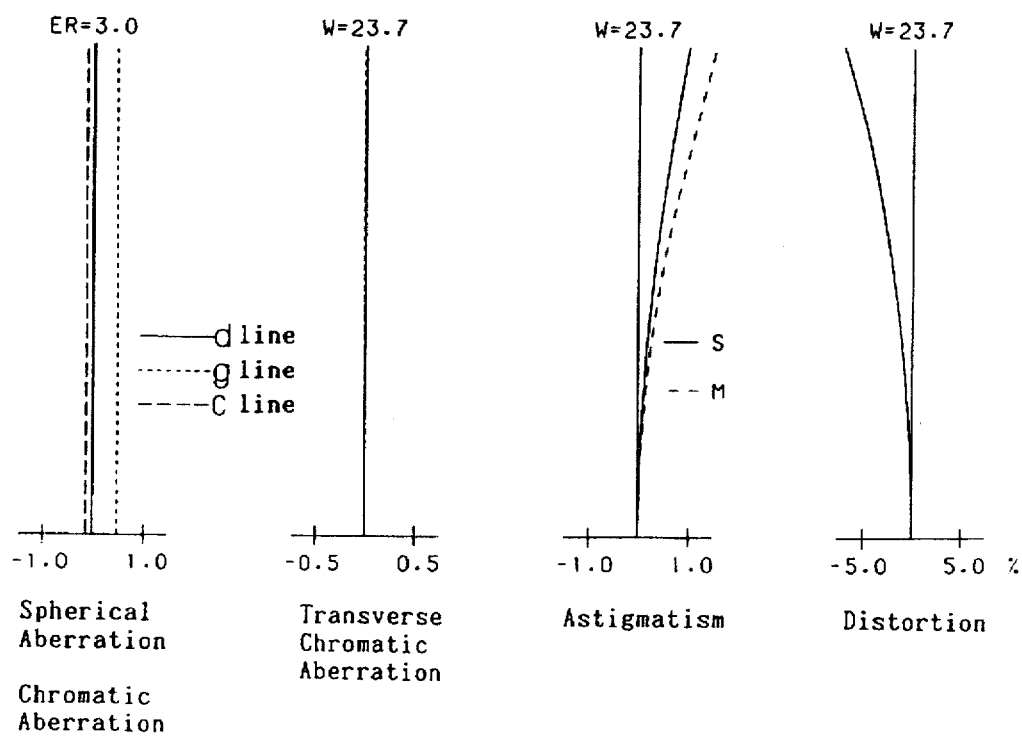
FIG. 10 shows diagrams of various aberrations of the real-image finder shown in FIG. 9.
Figure 11:
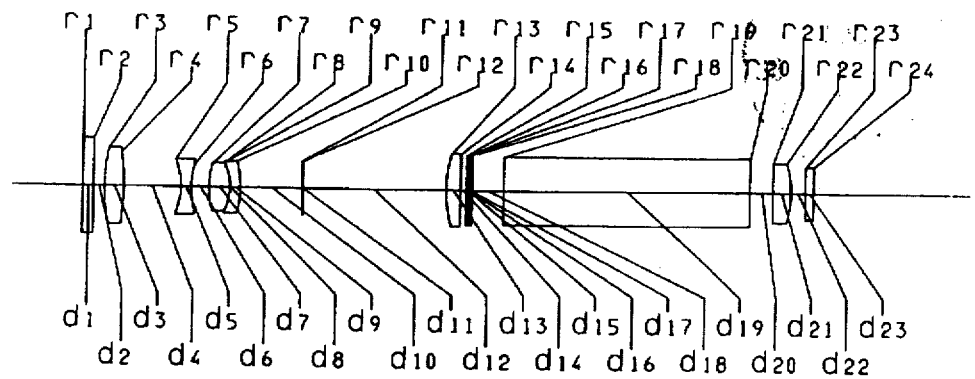
FIG. 11 is a schematic view showing a lens arrangement for a real-image finder of variable power at a telephoto extremity, according to the third embodiment of the present invention.

FIGS. 9 through 12 show a third embodiment of a variable power real-image finder, according to the present invention. FIGS. 9 and 11 show lens arrangements at the wide angle extremity and the telephoto extremity, respectively. In the third embodiment, the third lens group 13 is made of cemented first and second lens elements 13-1 and 13-2; and, the filter 15 is made of two cemented filter elements 15-1 and 15-2. The rest of the third embodiment structure is the same as that of the first embodiment.

Figure 12:
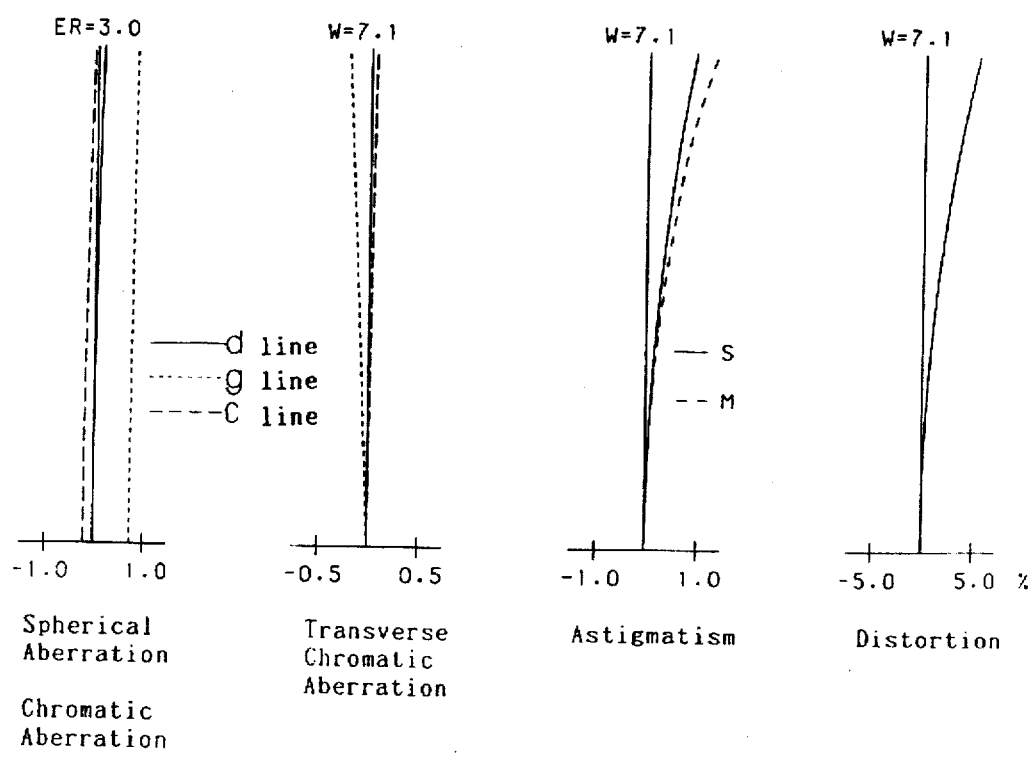
FIG. 12 shows diagrams of various aberrations of the real-image finder shown in FIG. 11.

Numerical data for this lens system is shown in Table 3 below. Aberrations at the wide angle extremity and the telephoto extremity are shown in FIGS. 10 and 12, respectively.

TABLE 3

$\omega = 23.7°\sim7.1°$
ER: $\phi$ 3
eye relief; 12.0 (from the second surface of the glass cover C)
$f_o = 12.29\sim38.28$
$f_e = 29.30$
finder magnification; 0.42~1.31
diopter; $-1.0\sim-1.0$ dptr (for an object located 3 m ahead)

| Surface No. | R | D | $N_d$ | $v_d$ | |
|---|---|---|---|---|---|
| 1 | ∞ | 1.55 | 1.49176 | 57.4 | (glass cover A) |
| 2 | ∞ | 1.49 | — | — | (glass cover A) |
| 3 | 24.028 | 2.80 | 1.49176 | 57.4 | |
| 4 * | −27.284 | 1.50–8.05 | — | — | |
| 5 * | −8.760 | 1.40 | 1.49176 | 57.4 | |
| 6 | 10.886 | 16.06–2.43 | — | — | |
| 7 * | 13.488 | 3.00 | 1.49176 | 57.4 | |
| 8 | −7.000 | 0.00 | — | — | |
| 9 | −7.000 | 1.50 | 1.58547 | 29.9 | |
| 10 * | −11.917 | 1.50–8.58 | — | — | |
| 11 | ∞ | 0.20 | 1.49176 | 57.4 | (glass cover B) |
| 12 | ∞ | 19.80 | — | — | (glass cover B) |
| 13 | 17.988 | 2.00 | 1.66680 | 33.0 | |
| 14 | ∞ | 0.80 | — | — | |
| 15 | ∞ | 0.40 | 1.51633 | 64.1 | (filter) |
| 16 | ∞ | 0.00 | — | — | (filter) |
| 17 | ∞ | 0.40 | 1.51633 | 64.1 | (filter) |
| 18 | ∞ | 4.40 | — | — | (filter) |
| 19 | ∞ | 34.14 | 1.80518 | 25.4 | (prism) |
| 20 | ∞ | 3.15 | — | — | (prism) |
| 21 * | 1587.349 | 2.60 | 1.49176 | 57.4 | |
| 22 | −14.533 | 2.00 | — | — | |
| 23 | ∞ | 1.20 | 1.49176 | 57.4 | (glass cover C) |
| 24 | ∞ | — | — | — | (glass cover C) |

Aspherical data

NO. 4;  K = 0.0, A4 = 0.54200 × $10^{-4}$, A6 = 0.26000 × $10^{-7}$,
A8 = 0.0, A10 = 0.0, A12 = 0.0
NO. 5;  K = 0.0, A4 = 0.69800 × $10^{-3}$, A6 = −0.40200 × $10^{-5}$,
A8 = 0.0, A10 = 0.0, A12 = 0.0
NO. 7;  K = 0.0, A4 = 0.56300 × $10^{-4}$, A6 = 0.75000 × $10^{-5}$,
A8 = 0.0, A10 = 0.0, A12 = 0.0
NO. 10; K = 0.0, A4 = 0.17000 × $10^{-3}$, A6 = 0.66600 × $10^{-5}$,
A8 = 0.0, A10 = 0.0, A12 = 0.0
NO. 21; K = 0.0, A4 = −0.58600 × $10^{-4}$, A6 = 0.22400 × $10^{-7}$,
A8 = −0.11000 × $10^{-9}$, A10 = 0.0, A12 = 0.0

* marked surface is aspherical.

Embodiment 4

Figure 13:
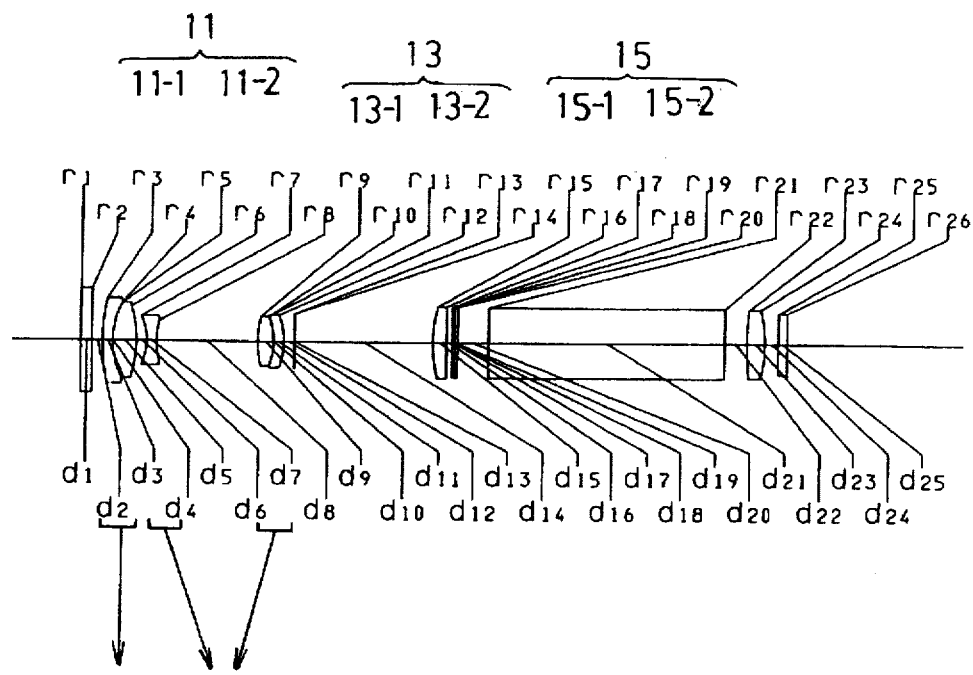
FIG. 13 is a schematic view showing a lens arrangement for a real-image finder of variable power at a wide angle extremity, according to the fourth embodiment of the present invention.
Figure 14:
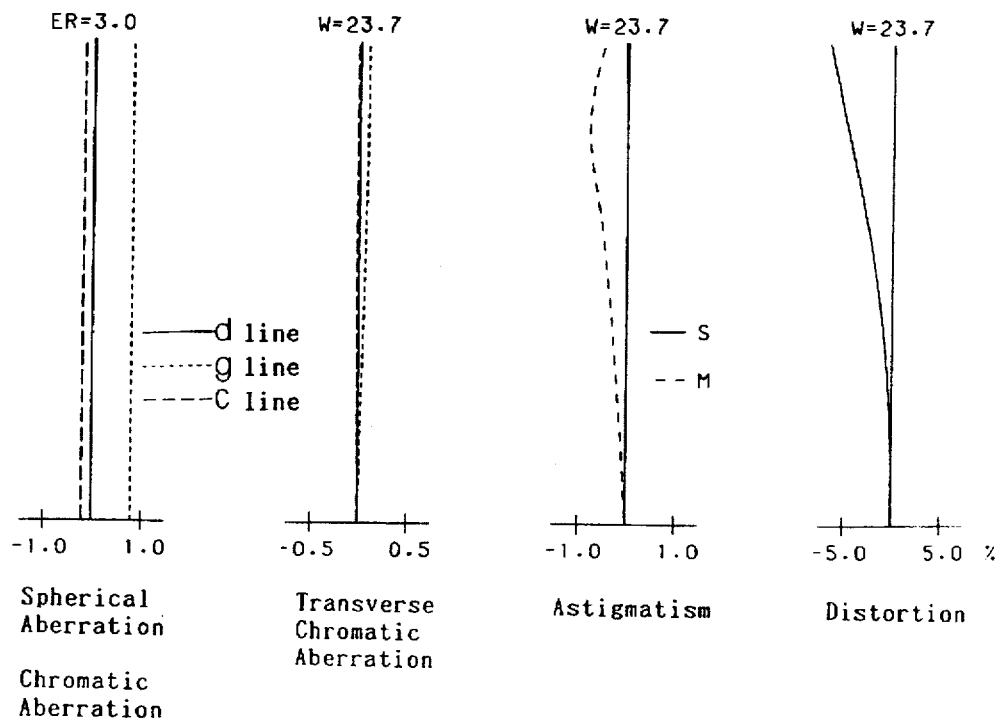
FIG. 14 shows diagrams of various aberrations of the real-image finder shown in FIG. 13.
Figure 15:
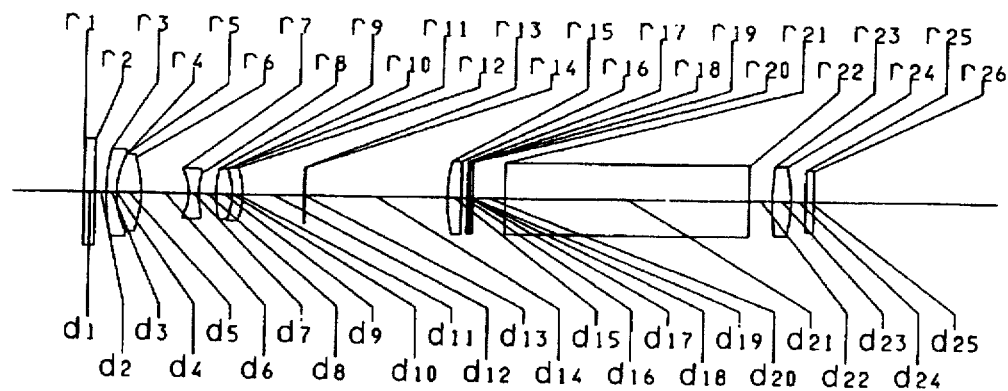
FIG. 15 is a schematic view showing a lens arrangement for a real-image finder of variable power at a telephoto extremity, according to the fourth embodiment of the present invention.

FIGS. 13 through 16 show a fourth embodiment of a variable power real-image finder, according to the present invention. FIGS. 13 and 15 show lens arrangements at the wide angle extremity and the telephoto extremity, respectively. In the fourth embodiment, the first lens group 11 is made of cemented first and second lens elements 11-1 and 11-2; the third lens group 13 is made of cemented first and second lens elements 13-1 and 13-2; and, the filter 15 is made of two cemented filter elements 15-1 and 15-2. The rest of the fourth embodiment structure is the same as that of the first embodiment.

Figure 16:
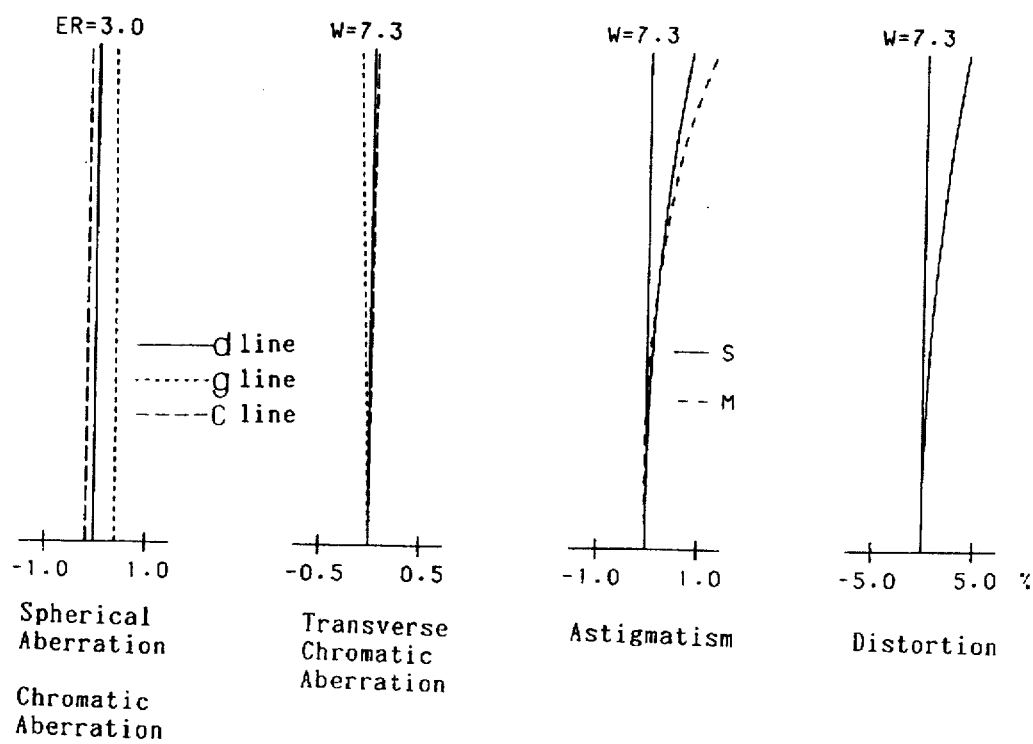
FIG. 16 shows diagrams of various aberrations of the real-image finder shown in FIG. 15.

Numerical data for this lens system is shown in Table 4 below. Aberrations at the wide angle extremity and the telephoto extremity are shown in FIGS. 14 and 16, respectively.

TABLE 4

ω = 23.7°–7.3°
ER: φ 3
eye relief; 15.65 (from the second surface of the glass cover C)
$f_o$ = 12.30–38.11
$f_e$ = 28.70
finder magnification; 0.43–1.33
diopter; –1.0—–1.0 dptr (for an object located 3 m ahead)

| Surface No. | R | D | $N_d$ | $v_d$ | |
|---|---|---|---|---|---|
| 1 | ∞ | 1.55 | 1.49176 | 57.4 | (glass cover A) |
| 2 | ∞ | 1.49 | — | — | (glass cover A) |
| 3 | 28.628 | 1.50 | 1.58547 | 29.9 | |
| 4 | 12.000 | 0.00 | — | — | |
| 5 | 12.000 | 3.50 | 1.49176 | 57.4 | |
| 6 * | –14.219 | 1.50–6.65 | — | — | |
| 7 * | –6.766 | 1.40 | 1.49176 | 57.4 | |
| 8 * | 10.612 | 14.56–2.40 | — | — | |
| 9 | 15.451 | 2.30 | 1.49176 | 57.4 | |
| 10 | –9.800 | 0.00 | — | — | |
| 11 | –9.800 | 1.50 | 1.58547 | 29.9 | |
| 12 * | –10.950 | 1.50–8.51 | — | — | |
| 13 | ∞ | 0.20 | 1.49176 | 57.4 | (glass cover B) |
| 14 | ∞ | 19.80 | — | — | (glass cover B) |
| 15 | 20.997 | 2.00 | 1.66680 | 33.0 | |
| 16 | ∞ | 0.80 | — | — | |
| 17 | ∞ | 0.40 | 1.51633 | 64.1 | (filter) |
| 18 | ∞ | 0.00 | — | — | (filter) |
| 19 | ∞ | 0.40 | 1.51633 | 64.1 | (filter) |
| 20 | ∞ | 4.40 | — | — | (filter) |
| 21 | ∞ | 34.14 | 1.80518 | 25.4 | (prism) |
| 22 | ∞ | 3.15 | — | — | (prism) |
| 23 * | 39.976 | 2.60 | 1.49176 | 57.4 | |
| 24 | –21.342 | 2.00 | — | — | |
| 25 | ∞ | 1.20 | 1.49176 | 57.4 | (glass cover C) |
| 26 | ∞ | — | — | — | (glass cover C) |

Aspherical data

NO. 6  K = 0.0, A4 = 0.15020 × $10^{-3}$, A6 = –0.29640 × $10^{-6}$,
A8 = 0.0, A10 = 0.0, A12 = 0.0

NO. 7  K = 0.0, A4 = 0.77730 × $10^{-3}$, A6 = 0.86030 × $10^{-5}$,
A8 = 0.0, A10 = 0.0, A12 = 0.0

NO. 8  K = 0.0, A4 = –0.36000 × $10^{-3}$, A6 = 0.67300 × $10^{-5}$,
A8 = 0.0, A10 = 0.0, A12 = 0.0

NO. 12  K = 0.0, A4 = 0.20230 × $10^{-3}$, A6 = 0.73200 × $10^{-6}$,
A8 = 0.0, A10 = 0.0, A12 = 0.0

NO. 23  K = 0.0, A4 = –0.34280 × $10^{-4}$, A6 = –0.28700 × $10^{-6}$,
A8 = 0.23730 × $10^{-8}$, A10 = 0.0, A12 = 0.0

* marked surface is aspherical.

TABLE 5

ω = 23.7°–7.3°
ER: φ 3
eye relief; 13.01 (from the second surface of the glass cover C)
$f_o$ = 12.24–38.20
$f_e$ = 28.02
finder magnification; 0.44–1.36
diopter; –1.0—–1.0 dptr (for an object located 3 m ahead)

| surface No. | R | D | $N_d$ | $v_d$ | |
|---|---|---|---|---|---|
| 1 | ∞ | 1.55 | 1.49176 | 57.4 | (glass cover A) |
| 2 | ∞ | 1.50–1.65–1.50 | — | — | (glass cover A) |
| 3 | 33.227 | 2.50 | 1.49176 | 57.4 | |
| 4 * | –16.869 | 1.50–4.43–6.97 | — | — | |
| 5 * | –8.803 | 1.40 | 1.58547 | 29.9 | |
| 6 * | 13.496 | 15.45–8.94–2.45 | — | — | |
| 7 | 13.873 | 2.70 | 1.49176 | 57.4 | |
| 8 * | –13.011 | 1.60–5.04–9.12 | — | — | |
| 9 | ∞ | 0.20 | 1.49176 | 57.4 | (glass cover B) |
| 10 | ∞ | 19.90 | — | — | (glass cover B) |
| 11 | 17.649 | 2.00 | 1.66680 | 33.0 | |
| 12 | ∞ | 0.80 | — | — | |
| 13 | ∞ | 0.40 | 1.51633 | 64.1 | (filter) |
| 14 | ∞ | 0.00 | — | — | (filter) |
| 15 | ∞ | 0.40 | 1.51633 | 64.1 | (filter) |
| 16 | ∞ | 4.40 | — | — | (filter) |
| 17 | ∞ | 34.14 | 1.80518 | 25.4 | (prism) |
| 18 | ∞ | 3.15 | — | — | (prism) |
| 19 * | 19.150 | 2.60 | 1.49176 | 57.4 | |
| 20 | –46.906 | 2.00 | — | — | |
| 21 | ∞ | 1.20 | 1.49176 | 57.4 | (glass cover C) |
| 22 | ∞ | — | — | — | (glass cover C) |

Aspherical data

NO. 4;  K = 0.0, A4 = 0.10680 × $10^{-3}$, A6 = –0.18500 × $10^{-6}$,
A8 = 0.0, A10 = 0.0, A12 = 0.0

NO. 5;  K = 0.0, A4 = 0.58300 × $10^{-3}$, A6 = –0.88200 × $10^{-6}$,
A8 = 0.0, A10 = 0.0, A12 = 0.0

NO. 6;  K = 0.0, A4 = –0.51000 × $10^{-5}$, A6 = –0.12620 × $10^{-5}$,
A8 = 0.0, A10 = 0.0, A12 = 0.0

NO. 8;  K = 0.0, A4 = 0.22570 × $10^{-3}$, A6 = 0.11440 × $10^{-5}$,
A8 = 0.0, A10 = 0.0, A12 = 0.0

NO. 19;  K = 0.0, A4 = –0.50100 × $10^{-4}$, A6 = –0.30500 × $10^{-6}$,
A8 = 0.18900 × $10^{-8}$, A10 = 0.0, A12 = 0.0

* marked surface is aspherical.

Embodiment 5

Figure 17:
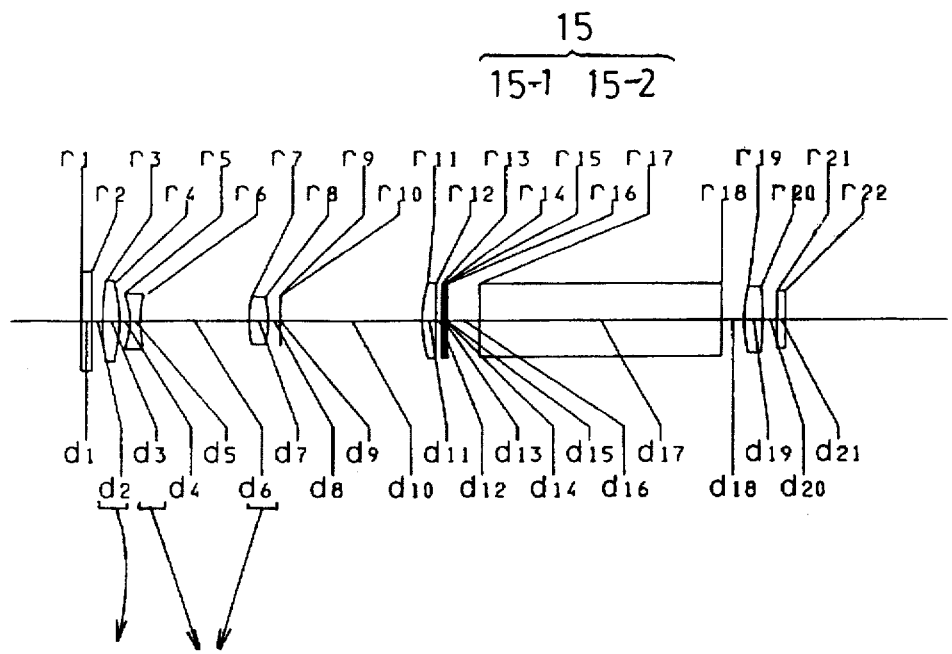
FIG. 17 is a schematic view showing a lens arrangement for a real-image finder of variable power at a wide angle extremity, according to the fifth embodiment of the present invention.
Figure 18:
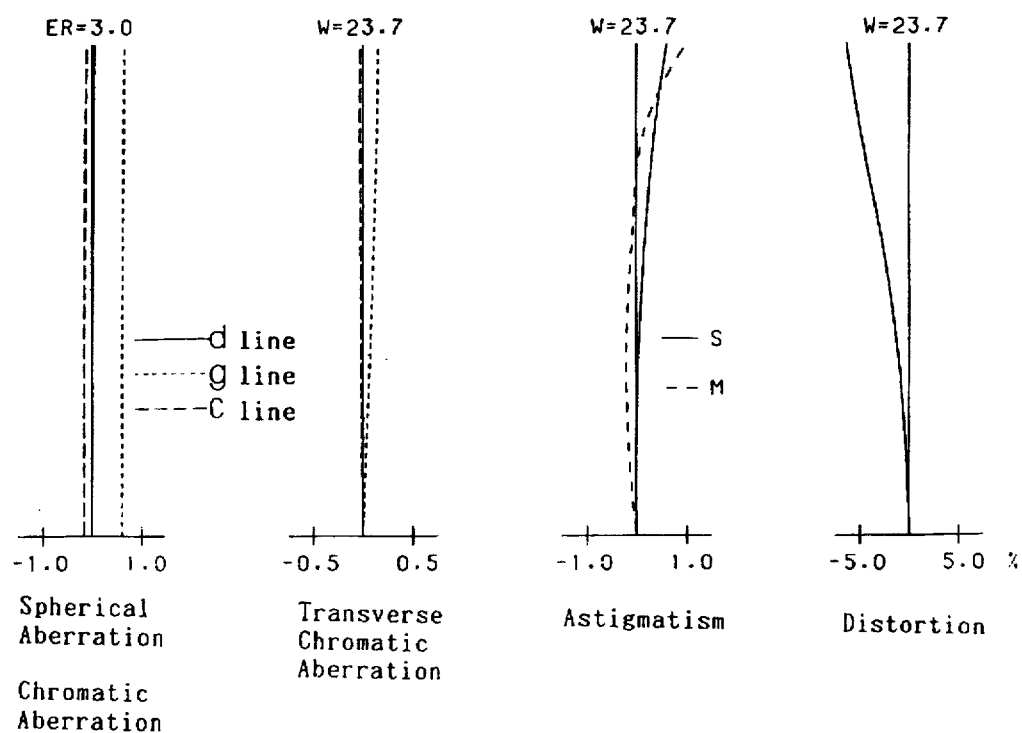
FIG. 18 shows diagrams of various aberrations of the real-image finder shown in FIG. 17.
Figure 19:
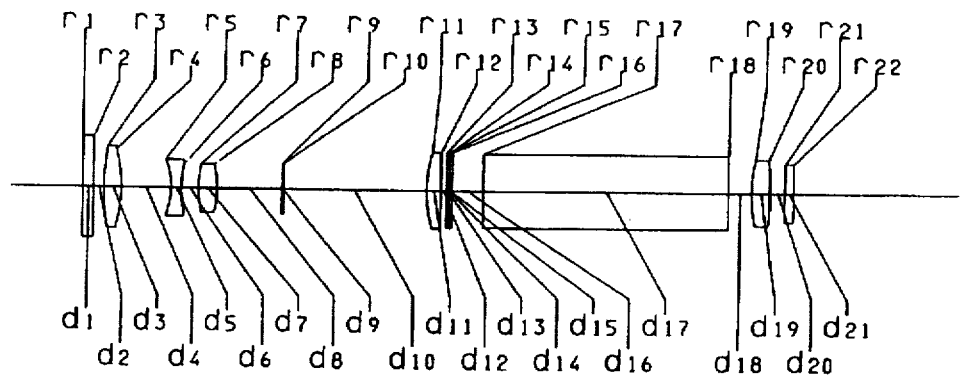
FIG. 19 is a schematic view showing a lens arrangement for a real-image finder of variable power at a telephoto extremity, according to the fifth embodiment of the present invention.

FIGS. 17 through 20 show a fifth embodiment of a variable power real-image finder, according to the present invention. FIGS. 17 and 19 show lens arrangements at the wide angle extremity and the telephoto extremity, respectively. In the fifth embodiment, the filter 15 is made of two cemented filter elements 15-1 and 15-2. The rest of the fifth embodiment structure is the same as that of the first embodiment.

Figure 20:
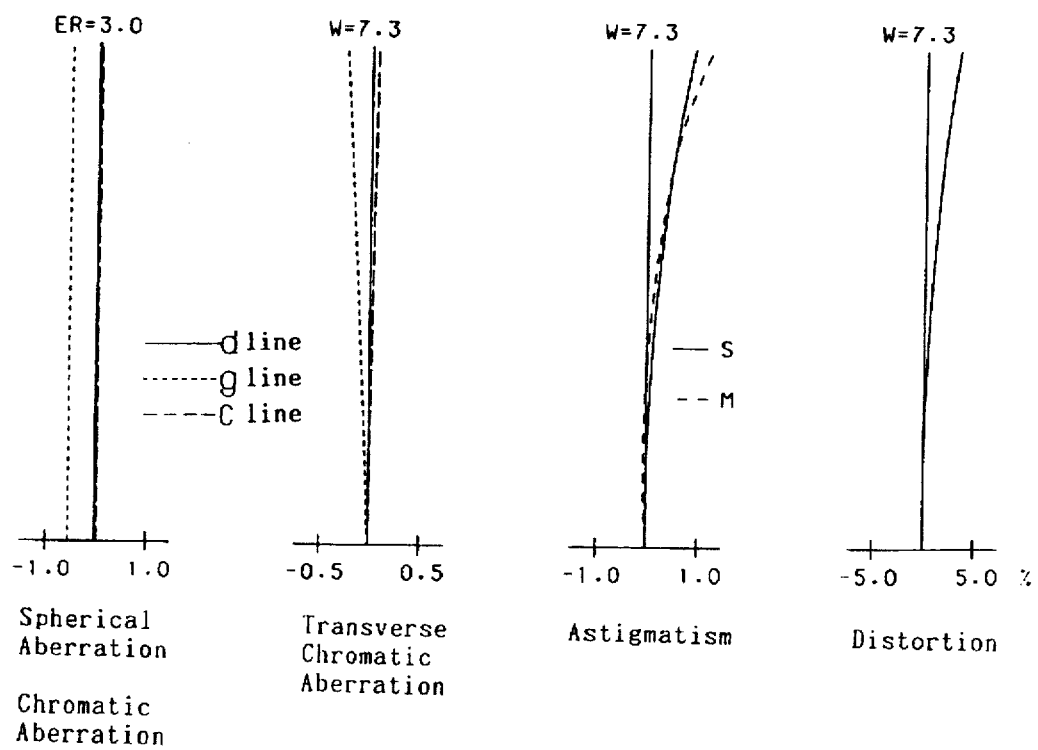
FIG. 20 shows diagrams of various aberrations of the real-image finder shown in FIG. 19.

Numerical data for this lens system is shown in Table 5 below. Aberrations at the wide angle extremity and the telephoto extremity are shown in FIGS. 18 and 20, respectively.

Embodiment 6

Figure 21:
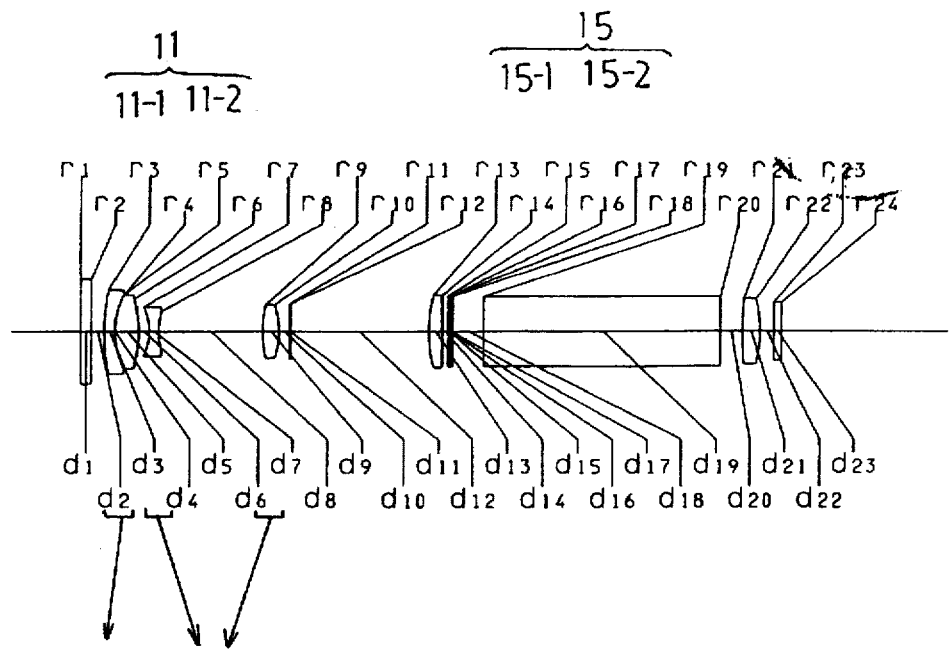
FIG. 21 is a schematic view showing a lens arrangement for a real-image finder of variable power at a wide angle extremity, according to the sixth embodiment of the present invention.
Figure 22:
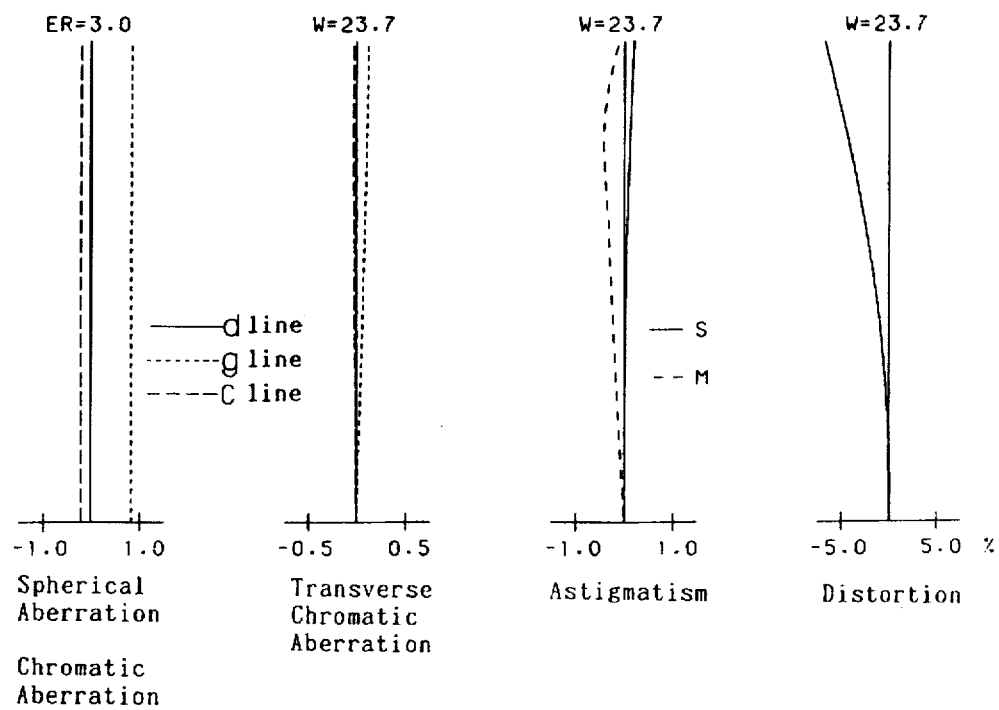
FIG. 22 shows diagrams of various aberrations of the real-image finder shown in FIG. 21.
Figure 23:
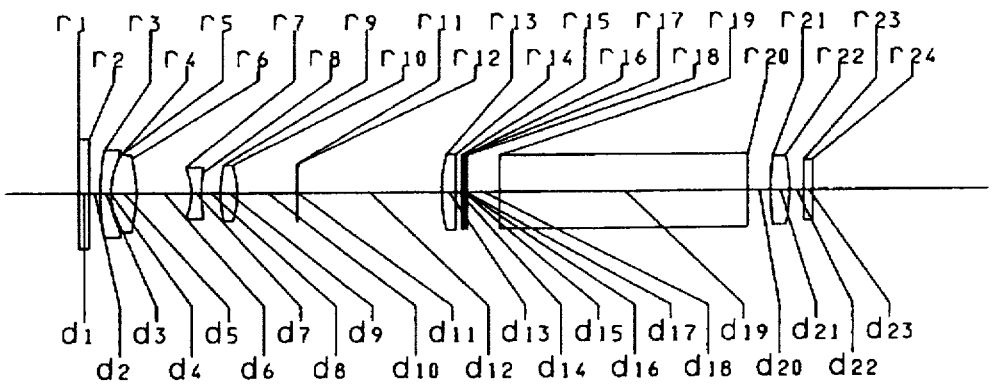
FIG. 23 is a schematic view showing a lens arrangement for a real-image finder of variable power at a telephoto extremity, according to the sixth embodiment of the present invention.

FIGS. 21 through 24 show a sixth embodiment of a variable power real-image finder, according to the present invention. FIGS. 21 and 23 show lens arrangements at the wide angle extremity and the telephoto extremity, respectively. In the sixth embodiment, the first lens group 11 is made of cemented lens elements 11-1 and 11-2; and the filter 15 is made of two cemented filter elements 15-1 and 15-2. The rest of the sixth embodiment structure is the same as that of the first embodiment.

Figure 24:
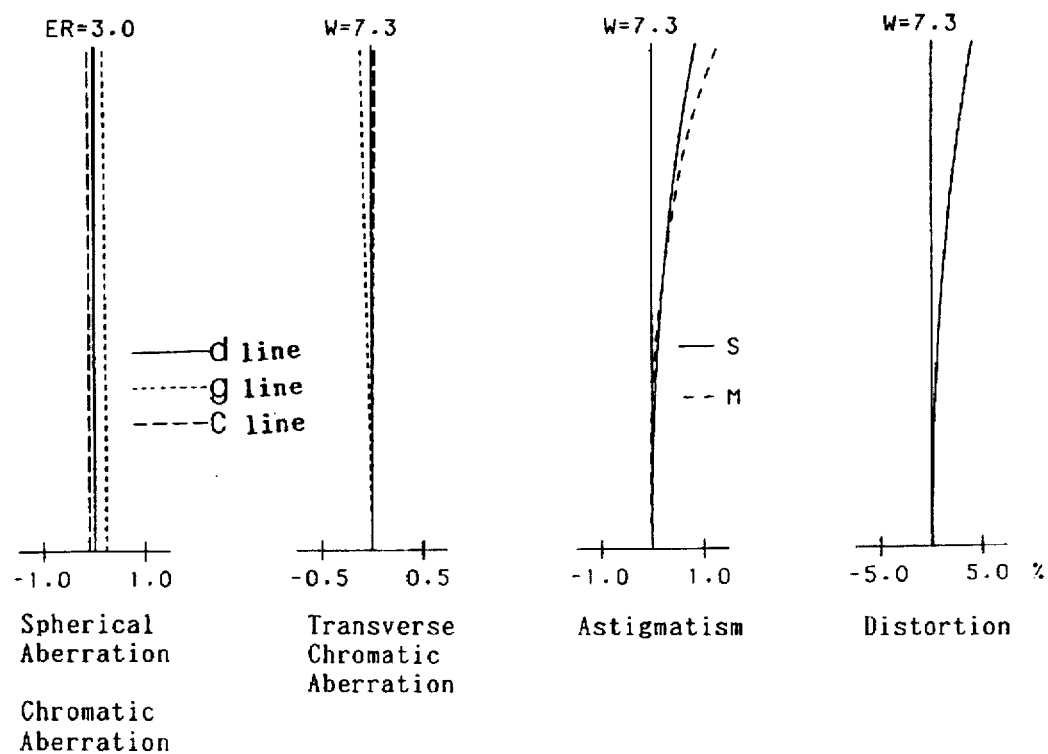
FIG. 24 shows diagrams of various aberrations of the real-image finder shown in FIG. 23.

Numerical data for this lens system is shown in Table 6 below. Aberrations at the wide angle extremity and the telephoto extremity are shown in FIGS. 22 and 24, respectively.

TABLE 6

$\omega = 23.7°–7.3°$
ER: φ 3
eye relief: 14.28 (from the second surface of the glass cover C)
$f_o = 12.28–38.18$
$f_e = 28.70$
finder magnification: 0.43–1.33
diopter: –1.0––1.0 dptr (for an object located 3 m ahead)

| Surface No. | R | D | $N_d$ | $\upsilon_d$ | |
|---|---|---|---|---|---|
| 1 | ∞ | 1.55 | 1.49176 | 57.4 | (glass cover A) |
| 2 | ∞ | 1.86–1.50 | — | — | (glass cover A) |
| 3 | 29.773 | 1.50 | 1.58547 | 29.9 | |
| 4 | 11.000 | 0.00 | — | — | |
| 5 | 11.000 | 3.54 | 1.49176 | 57.4 | |
| 6* | –15.844 | 1.50–7.57 | — | — | |
| 7* | –7.387 | 1.40 | 1.49176 | 57.4 | |
| 8* | 11.313 | 15.07–2.64 | — | — | |
| 9 | 17.073 | 2.38 | 1.49176 | 57.4 | |
| 10* | –10.765 | 1.50–8.22 | — | — | |
| 11 | ∞ | 0.20 | 1.49176 | 57.4 | (glass cover B) |
| 12 | ∞ | 19.80 | — | — | (glass cover B) |
| 13 | 20.065 | 2.00 | 1.66680 | 33.0 | |
| 14 | ∞ | 0.80 | — | — | |
| 15 | ∞ | 0.40 | 1.51633 | 64.1 | (filter) |
| 16 | ∞ | 0.00 | — | — | (filter) |
| 17 | ∞ | 0.40 | 1.51633 | 64.1 | (filter) |
| 18 | ∞ | 4.40 | — | — | (filter) |
| 19 | ∞ | 34.14 | 1.80518 | 25.4 | (prism) |
| 20 | ∞ | 3.15 | — | — | (prism) |
| 21* | 40.539 | 2.60 | 1.49176 | 57.4 | |
| 22 | –21.196 | 2.00 | — | — | |
| 23 | ∞ | 1.20 | 1.49176 | 57.4 | (glass cover C) |
| 24 | ∞ | — | — | — | (glass cover C) |

Aspherical data

NO. 6; $K = 0.0, A4 = 0.11100 \times 10^{-3}, A6 = -0.26300 \times 10^{-6}$,
$A8 = 0.0, A10 = 0.0, A12 = 0.0$ NO. 7; $K = 0.0, A4 = 0.69700 \times 10^{-3}, A6 = 0.42860 \times 10^{-5}$,
$A8 = 0.0, A10 = 0.0, A12 = 0.0$ NO. 8; $K = 0.0, A4 = -0.22200 \times 10^{-3}, A6 = 0.18620 \times 10^{-5}$,
$A8 = 0.0, A10 = 0.0, A12 = 0.0$ NO. 10; $K = 0.0, A4 = 0.22800 \times 10^{-3}, A6 = 0.11200 \times 10^{-5}$,
$A8 = 0.0, A10 = 0.0, A12 = 0.0$ NO. 21; $K = 0.0, A4 = -0.36200 \times 10^{-4}, A6 = -0.28500 \times 10^{-6}$,
$A8 = 0.17700 \times 10^{-8}, A10 = 0.0, A12 = 0.0$

* marked surface is aspherical.

Embodiment 7

Figure 25:
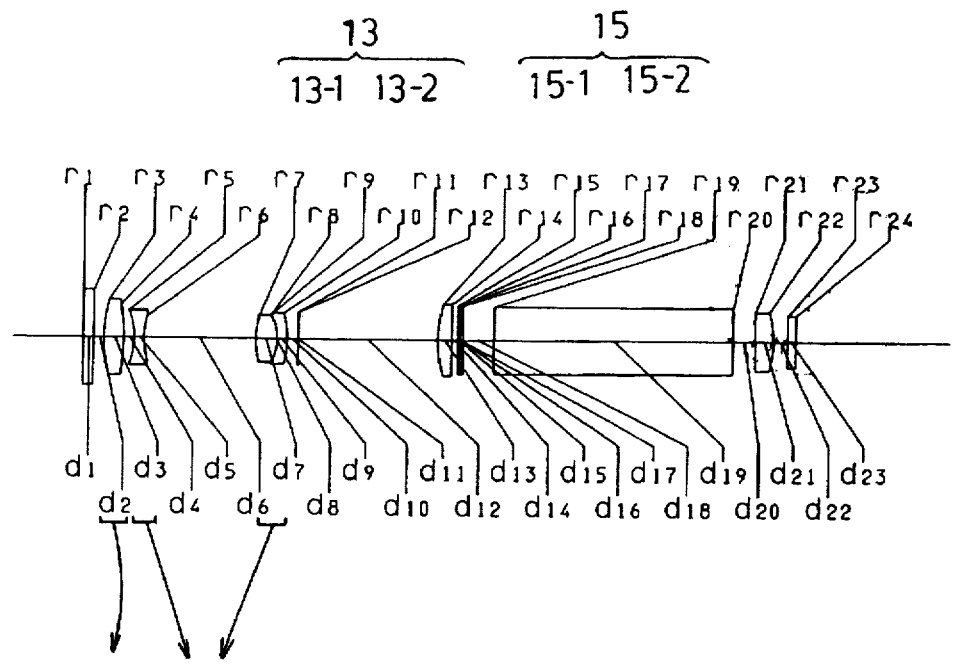
FIG. 25 is a schematic view showing a lens arrangement for a real-image finder of variable power at a wide angle extremity, according to the seventh embodiment of the present invention.
Figure 26:
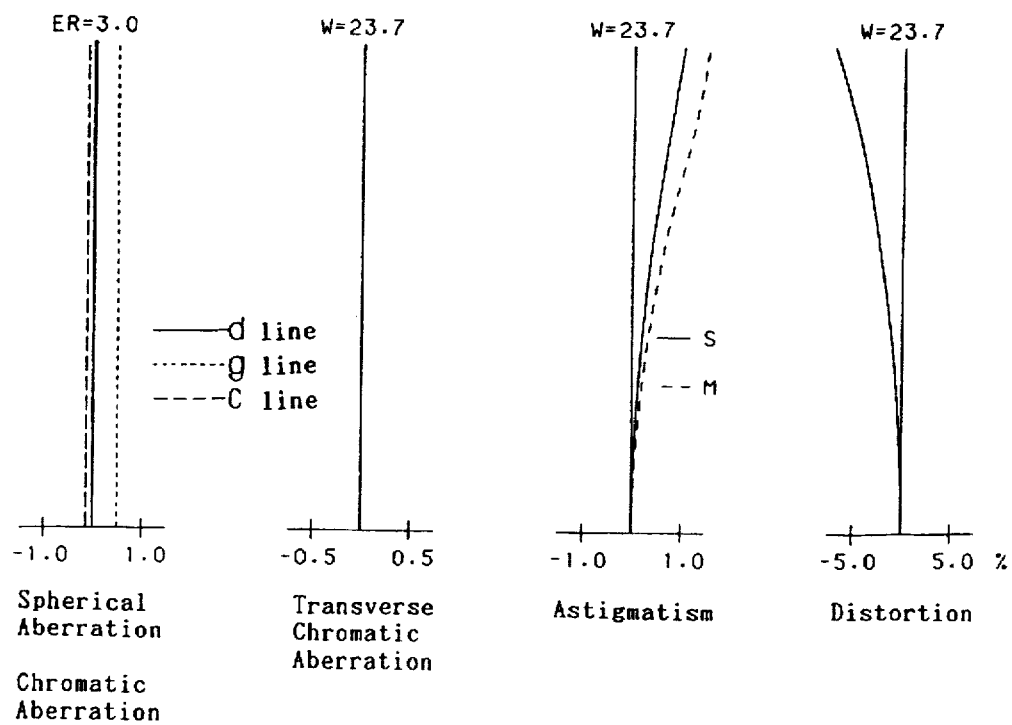
FIG. 26 shows diagrams of various aberrations of the real-image finder shown in FIG. 25.
Figure 27:
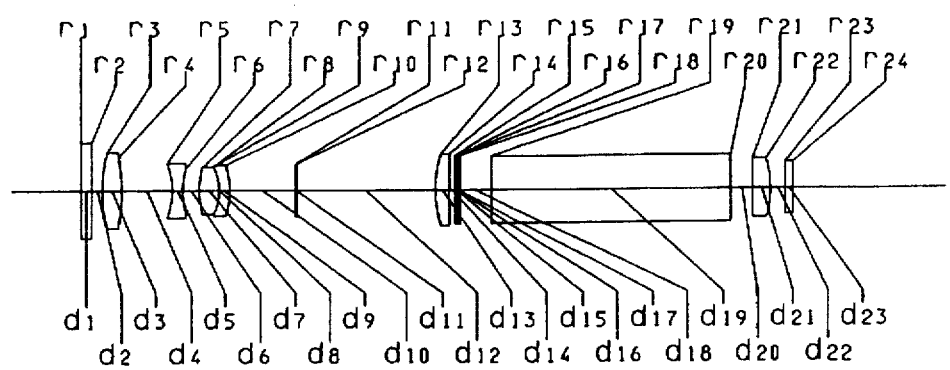
FIG. 27 is a schematic view showing a lens arrangement for a real-image finder of variable power at a telephoto extremity, according to the seventh embodiment of the present invention.

FIGS. 25 through 28 show a seventh embodiment of a variable power real-image finder, according to the present invention. FIGS. 25 and 27 show lens arrangements at the wide angle extremity and the telephoto extremity, respectively. In the seventh embodiment, the third lens group 13 is made of cemented lens elements 13-1 and 13-2: and the filter 15 is made of two cemented filter elements 15-1 and 15-2. The rest of the seventh embodiment structure is the same as that of the first embodiment.

Figure 28:
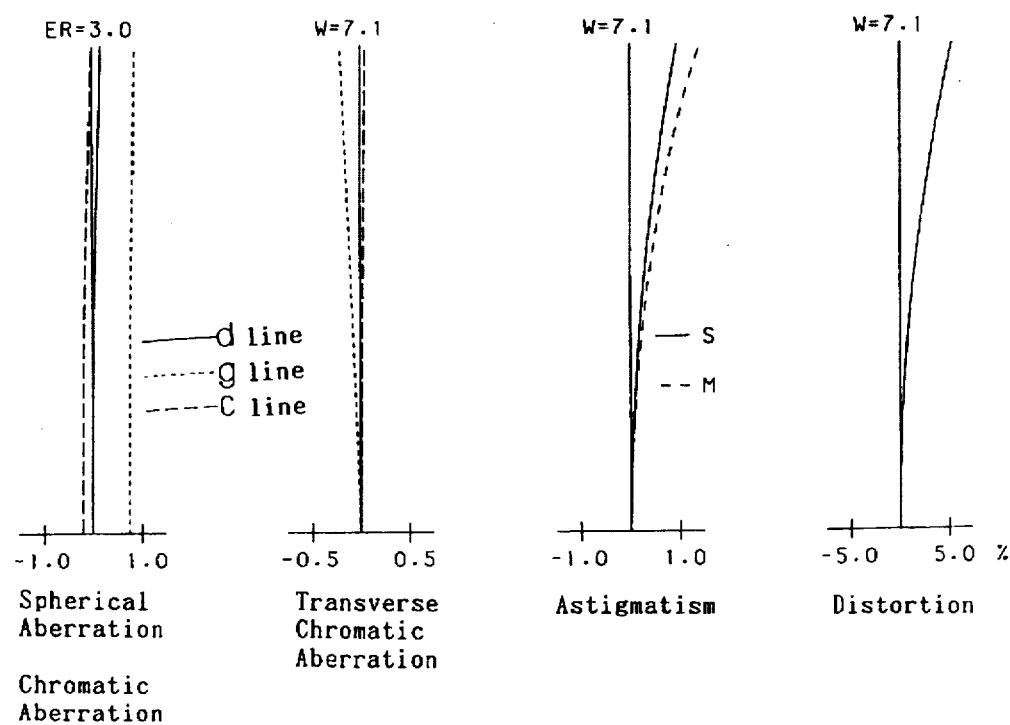
FIG. 28 shows diagrams of various aberrations of the real-image finder shown in FIG. 27.

Numerical data for this lens system is shown in Table 7 below. Aberrations at the wide angle extremity and the telephoto extremity are shown in FIGS. 26 and 28, respectively.

TABLE 7

$\omega = 23.7°–7.1°$
ER: φ 3
eye relief: 12.00 (from the second surface of the glass cover C)
$f_o = 12.28–38.28$
$f_e = 29.36$
finder magnification: 0.42–1.30
diopter: –1.0––1.0 dptr (for an object located 3 m ahead)

| Surface No. | R | D | $N_d$ | $\mu_d$ | |
|---|---|---|---|---|---|
| 1 | ∞ | 1.55 | 1.49176 | 57.4 | (glass cover A) |
| 2 | ∞ | 1.50–1.70–1.50 | — | — | (glass cover A) |
| 3 | 22.432 | 2.80 | 1.49176 | 57.4 | |
| 4* | –26.554 | 1.50–5.27–7.27 | — | — | |
| 5* | –8.504 | 1.40 | 1.49176 | 57.4 | |
| 6 | 10.584 | 16.05–9.47–2.40 | — | — | |
| 7* | 13.635 | 3.00 | 1.49176 | 57.4 | |
| 8 | –7.000 | 0.00 | — | — | |
| 9 | –7.000 | 1.50 | 1.58547 | 29.9 | |
| 10* | –11.779 | 1.50–4.11–9.38 | — | — | |
| 11 | ∞ | 0.20 | 1.49176 | 57.4 | (glass cover B) |
| 12 | ∞ | 19.80 | — | — | (glass cover B) |
| 13 | 17.929 | 2.00 | 1.66680 | 33.0 | |
| 14 | ∞ | 0.80 | — | — | |
| 15 | ∞ | 0.40 | 1.51633 | 64.1 | (filter) |
| 16 | ∞ | 0.00 | — | — | (filter) |
| 17 | ∞ | 0.40 | 1.51633 | 64.1 | (filter) |
| 18 | ∞ | 4.40 | — | — | (filter) |
| 19 | ∞ | 34.14 | 1.80518 | 25.4 | (prism) |
| 20 | ∞ | 3.15 | — | — | (prism) |
| 21* | –600.204 | 2.60 | 1.49176 | 57.4 | |
| 22 | –14.118 | 2.00 | — | — | |
| 23 | ∞ | 1.20 | 1.49176 | 57.4 | (glass cover C) |
| 24 | ∞ | — | — | — | (glass cover C) |

Aspherical data

NO. 4; $K = 0.0, A4 = 0.65000 \times 10^{-4}, A6 = 0.128000 \times 10^{-7}, A8 = 0.0$
$A10 = 0.0, A12 = 0.0$ NO. 5; $K = 0.0, A4 = 0.78700 \times 10^{-3}, A6 = -0.52460 \times 10^{-5}, A8 = 0.0$
$A10 = 0.0, A12 = 0.0$ NO. 7; $K = 0.0, A4 = 0.35000 \times 10^{-4}, A6 = 0.81400 \times 10^{-5}, A8 = 0.0$
$A10 = 0.0, A12 = 0.0$ NO. 10; $K = 0.0, A4 = 0.15700 \times 10^{-3}, A6 = 0.69300 \times 10^{-5}, A8 = 0.0$
$A10 = 0.0, A12 = 0.0$ NO. 21; $K = 0.0, A4 = -0.59700 \times 10^{-4}, A6 = -0.29300 \times 10^{-7}$,
$A8 = 0.28400 \times 10^{-9}, A10 = 0.0, A12 = 0.0$

*marked surface is aspherical.

Embodiment 8

Figure 29:
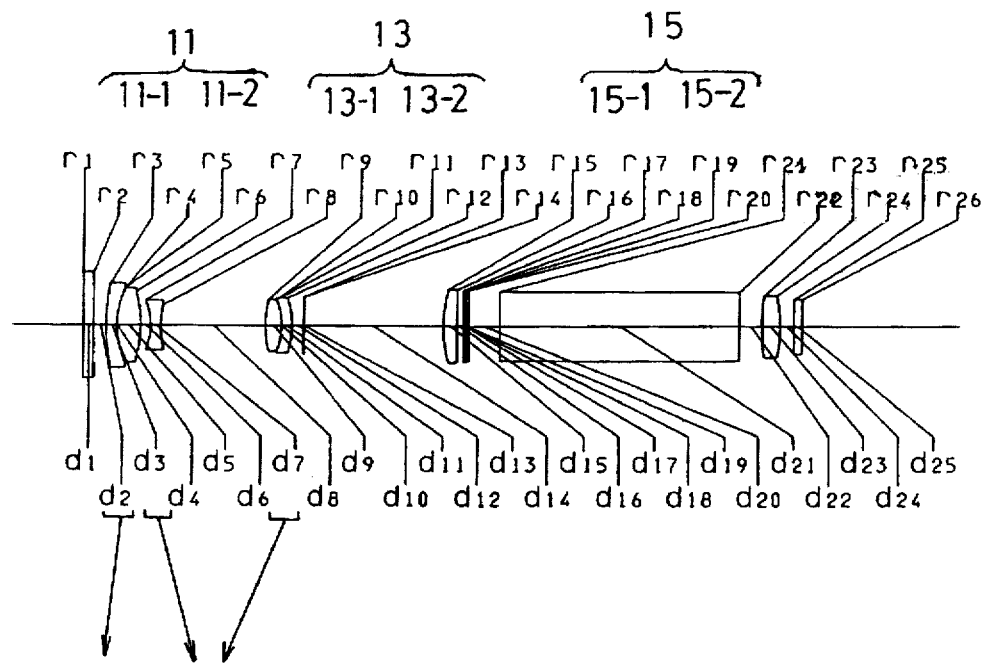
FIG. 29 is a schematic view showing a lens arrangement for a real-image finder of variable power at a wide angle extremity, according to the eighth embodiment of the present invention.
Figure 30:
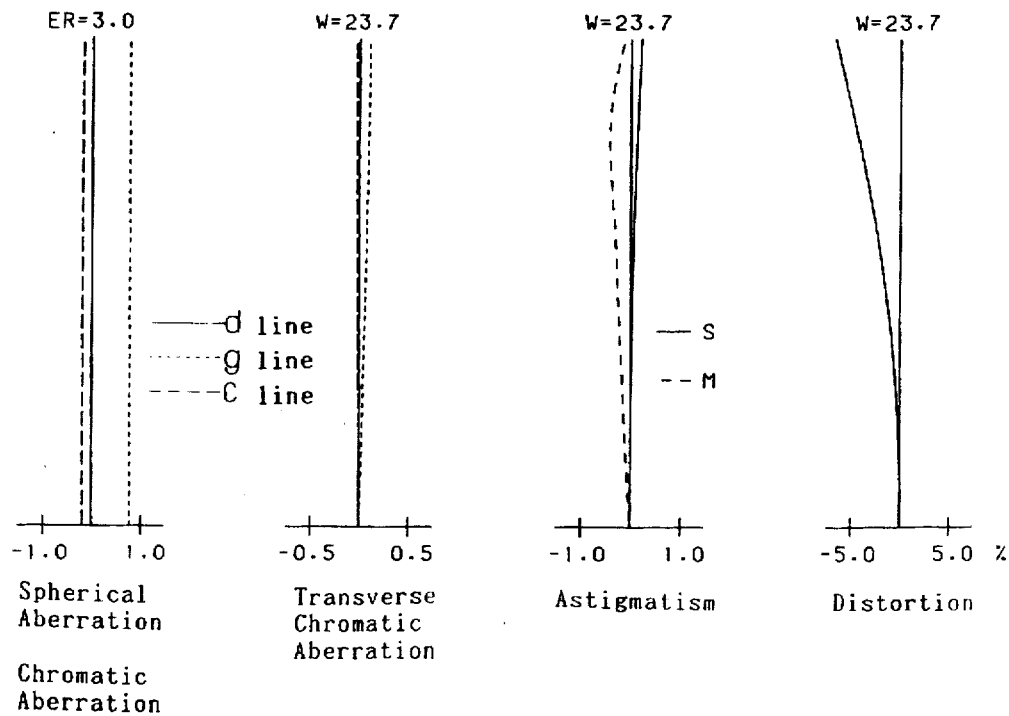
FIG. 30 shows diagrams of various aberrations of the real-image finder shown in FIG. 29.
Figure 31:
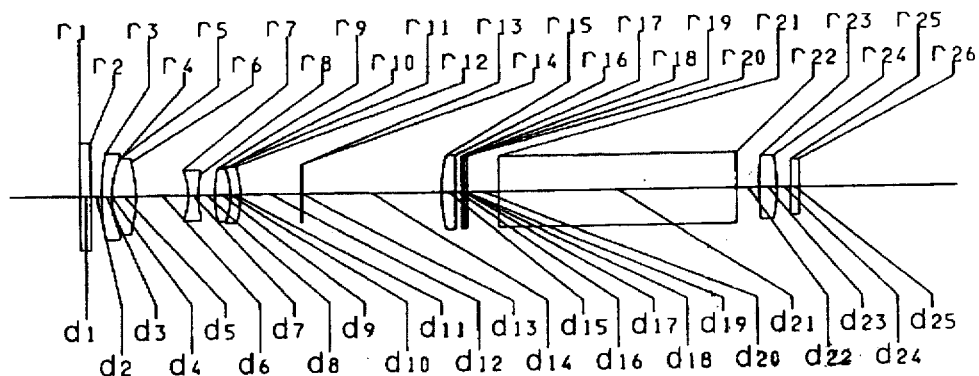
FIG. 31 is a schematic view showing a lens arrangement for a real-image finder of variable power at a telephoto extremity, according to the eighth embodiment of the present invention; and, FIG. 32 shows diagrams of various aberrations of the real-image finder shown in FIG. 31.

FIGS. 29 through 32 show an eighth embodiment of a variable power real-image finder, according to the present invention. FIGS. 29 and 31 show lens arrangements at the wide angle extremity and the telephoto extremity, respectively. In the eighth embodiment, the first lens group 11 is made of cemented lens elements 11-1 and 11-2; the third lens group 13 is made of cemented lens elements 13-1 and 13-2; and the filter 15 is made of two cemented filter elements 15-1 and 15-2. The rest of the eighth embodiment structure is the same as that of the first embodiment.

Figure 32:
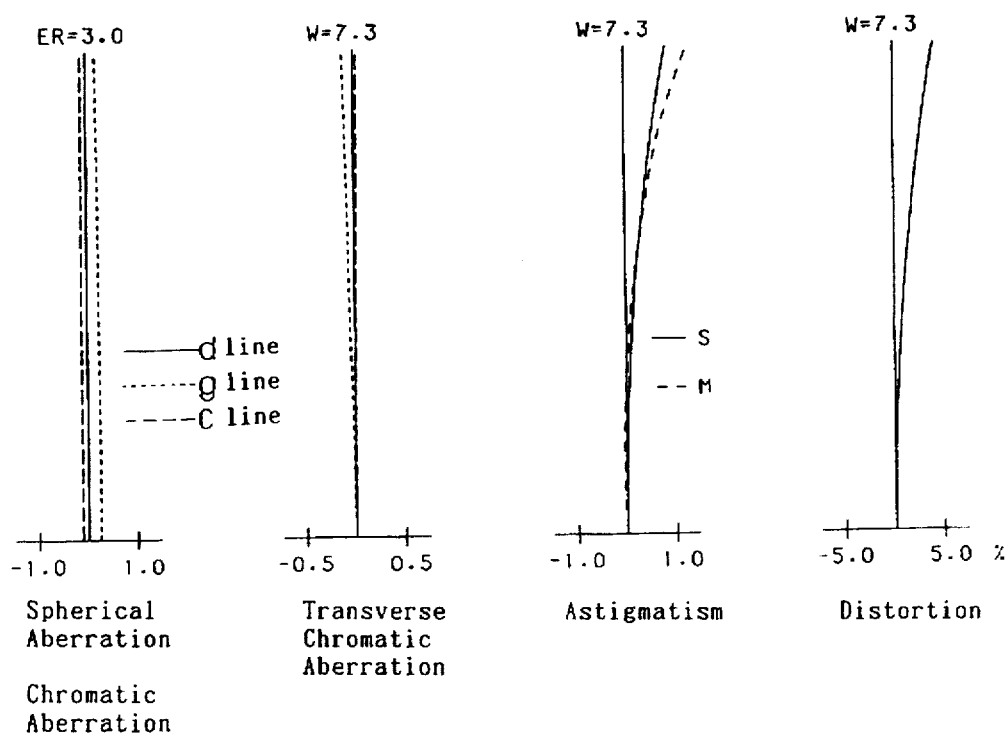

Numerical data for this lens system is shown in Table 8 below. Aberrations at the wide angle extremity and the telephoto extremity are shown in FIGS. 30 and 32, respectively.

TABLE 8

ω = 23.7°~7.25°
ER: φ 3
eye relief; 12.73 (from the second surface of the glass cover c)
$f_0$ = 12.27~38.18
$f_e$ = 28.65
finder magnification: 0.43~1.33
diopter; -1.0—-1.0 dptr (for an object located 3 m ahead)

| Surface No. | R | D | $N_d$ | $\mu_d$ |
|---|---|---|---|---|
| 1 | ∞ | 1.55 | 1.49176 | 57.4 (glass cover A) |
| 2 | ∞ | 1.90–1.50 | — | — (glass cover A) |
| 3 | 31.250 | 1.50 | 1.58547 | 29.9 |
| 4 | 12.000 | 0.00 | — | — |
| 5 | 12.000 | 3.50 | 1.49176 | 57.4 |
| 6* | -15.685 | 1.50–7.44 | — | — |
| 7* | -7.450 | 1.40 | 1.49176 | 57.4 |
| 8* | 11.256 | 15.05–2.40 | — | — |
| 9 | 15.668 | 2.30 | 1.49176 | 57.4 |
| 10 | -9.800 | 0.00 | — | — |
| 11 | -9.800 | 1.50 | 1.58547 | 29.9 |
| 12* | -11.191 | 1.60–8.71 | — | — |
| 13 | ∞ | 0.20 | 1.49176 | 57.4 (glass cover B) |
| 14 | ∞ | 19.80 | — | — (glass cover B) |
| 15 | 19.634 | 2.00 | 1.66680 | 33.0 |
| 16 | ∞ | 0.80 | — | — |
| 17 | ∞ | 0.40 | 1.51633 | 64.1 (filter) |
| 18 | ∞ | 0.00 | — | — (filter) |
| 19 | ∞ | 0.40 | 1.51633 | 64.1 (filter) |
| 20 | ∞ | 4.40 | — | — (filter) |
| 21 | ∞ | 34.14 | 1.80518 | 25.4 (prism) |
| 22 | ∞ | 3.15 | — | — (prism) |
| 23* | 37.614 | 2.60 | 1.49176 | 57.4 |
| 24 | -22.017 | 2.00 | — | — |
| 25 | ∞ | 1.20 | 1.49176 | 57.4 (glass cover C) |
| 26 | ∞ | — | — | — (glass cover C) |

Aspherical data

NO. 6; K = 0.0, A4 = 0.11300 × $10^{-3}$, A6 = -0.20200 × $10^{-6}$, A8 = 0.0
A10 = 0.0, A12 = 0.0
NO. 7; K = 0.0, A4 = 0.61200 × $10^{-3}$, A6 = 0.54800 × $10^{-5}$, A8 = 0.0
A10 = 0.0, A12 = 0.0
NO. 8; K = 0.0, A4 = -0.28500 × $10^{-3}$, A6 = 0.44300 × $10^{-5}$, A8 = 0.0
A10 = 0.0, A12 = 0.0
NO. 12; K = 0.0, A4 = 0.18400 × $10^{-3}$, A6 = 0.90500 × $10^{-6}$, A8 = 0.0
A10 = 0.0, A12 = 0.0
NO. 23; K = 0.0, A4 = -0.37700 × $10^{-4}$, A6 = -0.23200 × $10^{-6}$,
A8 = 0.15500 × $10^{-8}$, A10 = 0.0, A12 = 0.0

*marked surface is aspherical.

Table 9 below shows numerical values for the magnification defined by the relationships (1) through (4) in the above-mentioned embodiments.

TABLE 9

| | formula (1) | formula (2) | formula (3) | formula (4) |
|---|---|---|---|---|
| embodiment (1) | 0.743 | 1.403 | 0.792 | 1.306 |
| embodiment (2) | 0.743 | 1.397 | 0.792 | 1.299 |
| embodiment (3) | 0.683 | 1.273 | 0.733 | 1.217 |
| embodiment (4) | 0.748 | 1.415 | 0.800 | 1.307 |
| embodiment (5) | 0.741 | 1.362 | 0.772 | 1.305 |
| embodiment (6) | 0.693 | 1.320 | 0.775 | 1.261 |
| embodiment (7) | 0.714 | 1.276 | 0.736 | 1.276 |
| embodiment (8) | 0.698 | 1.309 | 0.772 | 1.276 |

As can be seen from Table 9, the numerical values for each embodiment satisfies the formulae (1) through (4), as well as the formulae (5) and (6). It has also been experimentally found that the aberrations could be well corrected in the variable power real-image finder according to the present invention.

As can be understood from the above discussion, according to the present invention, a high magnification of more than three times can be obtained by a small variable power real-image finder.

We claim:

1. A real-image finder having a variable power comprising an objective lens system of positive power, a condenser lens, an image erecting systems and an ocular lens system, in this order from an object side, wherein;

said objective lens system comprises at least three lens groups including a first lens group of positive power, a second lens group of negative power, and a third lens group of positive power, in this order from the object side;

the second lens group being moved towards an image side and the third lens group being moved toward an object side, when the magnification changes from a wide angle side to a telephoto side, so that the distance between the first lens group and the second lens group increases, the distance between the second lens group and the third lens group decreases, and the distance between the third lens group and the condenser lens increases, and;

the real-image finder meets the requirements defined by the relationships:

$0.5 < |m_{2W}| < 1.0$
$1.1 < |m_{2T}|$
$0.5 < |m_{3W}| < 1.0$
$1.1 < |m_{3T}|$ wherein, $m_{2W}$ represents a lateral magnification of the second lens group at the wide angle end, $m_{2T}$ represents a lateral magnification of the second lens group at the telephoto end, $m_{3W}$ represents a lateral magnification of the third lens group at the wide angle end, and $m_{3T}$ represents a lateral magnification of the third lens group at the telephoto end.

2. A real-image finder according to claim 1, wherein the following relationships are further satisfied:

$1.1 < |m_{2\ T}| < 1.7$
$1.1 < |m_{3\ T}| < 1.7$.

3. A real-image finder according to claim 1, wherein said first lens group does not move when the magnification is varied.

4. A real-image finder according to claim 1, wherein an image side surface of said first lens group and an object side surface of said second lens group are aspherical surfaces.

5. A real-image finder according to claim 4, wherein the aspherical surface of the first lens group is a convex surface facing the image side and having positive surface power which is decreased toward the peripheral edge thereof; and the aspherical surface of the second lens group is a concave surface facing the object side and having negative surface power which is decreased toward the peripheral edge thereof.

6. A real-image finder according to claim 1, wherein the second lens group is a single concavo-concave lens of negative power having aspherical surfaces on both sides.

7. A real-image finder according to claim 6, wherein the aspherical surfaces of the negative concavo-concave lens have a negative surface power which decreases toward the peripheral edge thereof.

8. A real-image finder according to claim 1, wherein the first positive lens group, the second negative lens group, and the third positive lens group, of the objective lens system are each a single lens.

9. The real-image finder having a variable power according to claim 1, said finder having a zoom ratio of greater than 3.

10. The real-image finder having a variable power according to claim 1, said second lens group and said third lens group having a substantially same power ratio at high magnification.

11. The real-image finder having a variable power according to claim 1, the variable power of the real-image finder including an actual size magnification.

* * * * *